United States Patent
Chikan et al.

(10) Patent No.: US 12,514,816 B2
(45) Date of Patent: Jan. 6, 2026

(54) SYNERGIST THERAPY FOR ENHANCED DRUG DELIVERY: MAGNETIC FIELD FACILITATED NANOPARTICLE MICROPORATION

(71) Applicant: Kansas State University Research Foundation, Manhattan, KS (US)

(72) Inventors: Viktor Chikan, Manhattan, KS (US); Ryan Rafferty, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 1049 days.

(21) Appl. No.: 17/442,349

(22) PCT Filed: Mar. 25, 2020

(86) PCT No.: PCT/US2020/024663
§ 371 (c)(1),
(2) Date: Sep. 23, 2021

(87) PCT Pub. No.: WO2020/198328
PCT Pub. Date: Oct. 1, 2020

(65) Prior Publication Data
US 2022/0175661 A1    Jun. 9, 2022

Related U.S. Application Data

(60) Provisional application No. 62/823,383, filed on Mar. 25, 2019.

(51) Int. Cl.
*A61K 9/00*      (2006.01)
*A61K 41/00*    (2020.01)
(Continued)

(52) U.S. Cl.
CPC .......... *A61K 9/0009* (2013.01); *A61K 9/0019* (2013.01); *A61K 41/0023* (2013.01);
(Continued)

(58) Field of Classification Search
None
See application file for complete search history.

(56) References Cited

U.S. PATENT DOCUMENTS 6,527,716 B1    3/2003   Eppstein
8,060,179 B1 *  11/2011  Flynn ...................... A61B 5/05
                                                                600/409
(Continued)

FOREIGN PATENT DOCUMENTS

WO       2004024910         3/2004
WO       WO-2018064150 A1 * 4/2018   ............ A61K 38/14

OTHER PUBLICATIONS

Geilich, B. M., Gelfat, I., Sridhar, S., van de Ven, A. L., & Webster, T. J. (2017). Superparamagnetic iron oxide-encapsulating polymersome nanocarriers for biofilm eradication. Biomaterials, 119, 78-85. https://doi.org/10.1016/j.biomaterials.2016.12.011 (Year: 2017).*

(Continued)

*Primary Examiner* — Charles A Marmor, II
*Assistant Examiner* — Marc D. Honrath
(74) *Attorney, Agent, or Firm* — Hovey Williams LLP; Crissa A. Cook

(57) ABSTRACT

Methods for enhancing intracellular uptake of active agents by inducing temporary pore formation in a cell membrane are described. The methods generally comprise introducing nanoparticles to a cell in vivo, ex vivo, or in cell culture to magnetic nanoparticles that are taken up into the cell interior. The methods further comprise introducing active agents to the cell. A magnetic field is applied to the cell for targeted excitation of the internalized magnetic nanoparticles to induce temporary pore formation in the cell membrane, such that the active agent is taken up in an increased amount and/or at an increased rate by the cell.

17 Claims, 14 Drawing Sheets

(51) Int. Cl.
A61N 2/00 (2006.01)
C12N 13/00 (2006.01)
(52) U.S. Cl.
CPC .......... *A61K 41/0047* (2013.01); *A61N 2/002* (2013.01); *C12N 13/00* (2013.01)

(56) References Cited

U.S. PATENT DOCUMENTS

| | | | |
|---|---|---|---|
| 2002/0192814 A1* | 12/2002 | Tamarkin | C07K 14/525 435/320.1 |
| 2004/0038303 A1* | 2/2004 | Unger | A61K 49/0065 536/123 |
| 2010/0249488 A1 | 9/2010 | Kardos et al. | |
| 2011/0251547 A1 | 10/2011 | Xing et al. | |
| 2019/0085034 A1* | 3/2019 | Wooster | A61K 31/337 |

OTHER PUBLICATIONS

International Search Report and Written Opinion in corresponding PCT/US2020/024663, dated Jun. 30, 2020.
"Magnetofection", Mar. 11, 2019, wikipedia.com.
Hiremath, et al., "Synergistic delivery of 5-fluorouracil and curcumin using human serum albumin-coated iron oxide nanoparticles by folic acid targeting", Progress in Biomaterials, 2018, 7, pp. 297-306.
Podaru, et al., "Pulsed Magnetic Field Induced Fast Drug Release from Magneto Liposomes via Ultrasound Generation", J. Phys. Chem. B, 2014, 118, pp. 11715-11722.
Podaru, et al., "Magnetic Field Induced Ultrasound from Colloidal Superparamagnetic Nanoparticles", J. Phys. Chem. C, 2016, 120, pp. 2386-2391.
Chithrani, et al., "Determining the Size and Shape Dependence of Gold Nanoparticle Uptake into Mammalian Cells", Nano Lett., 2006, 6(4), pp. 662-668 (abstract attached).
Win, et al., "Effects of Particle Size and Surface Coating on Cellular Uptake of Polymeric Nanoparticles for Oral Delivery of Anticancer Drugs", Biomaterials, 2005, 26(15), pp. 2713-2722.
Schroeder, et al., "Folate-Mediated Tumor Cell Uptake of Quantum Dots Entrapped in Lipid Nanoparticles", J Controlled Release, 2007, 124(1-2), pp. 28-34 (abstract attached).
Heiden, et al., "Understanding the Warburg Effect: The Metabolic Requirements of Cell Proliferation", Science, 2009, 324(5930), pp. 1029-1033.
Kim, et al., "Cancer's Molecular Sweet Tooth and the Warburg Effect", Cancer Res, 2006, 15, 66(18), pp. 8927-8930.
Van Dam, et al., "Intraoperative Tumor-Specific Fluorescence Imaging in Ovarian Cancer by Folate Receptor—A Targeting: First in-Human Results", Nature Medicine, 2011, 17, pp. 1315-1319 (abstract attached).
Sudimack, et al., "Targeted Drug Delivery via the Folate Receptor", Adv Drug Deliv Rev, 2000, 41(2), pp. 147-162 (abstract attached).
Weitman, et al., "Distribution of the Folate Receptor Gp38 in Normal and Malignant Cell Lines and Tissues", Can Res, 1992, 52, pp. 3396-3401.
Hoang, et al., "In Pursuit of Balgacyclamide a—Discovery of an Oxazoline Macrocycle with Multiple Myeloma Cytotoxicity and Penetration", Tetrahedron Letters, 2017, 58(47), pp. 4432-4435 (abstract attached).

* cited by examiner

SYNERGIST THERAPY FOR ENHANCED DRUG DELIVERY: MAGNETIC FIELD FACILITATED NANOPARTICLE MICROPORATION

CROSS-REFERENCE TO RELATED APPLICATIONS

The present application is the U.S. National Stage of International Patent Application No. PCT/US2020/024663, filed Mar. 25, 2020, which claims the priority benefit of U.S. Provisional Patent Application Ser. No. 62/823,383, filed Mar. 25, 2019, entitled SYNERGIST THERAPY FOR ENHANCED DRUG DELIVERY: MAGNETIC FIELD FACILITATED NANOPARTICLE MICROPORATION, each of which is incorporated by reference in its entirety herein.

FEDERALLY SPONSORED RESEARCH OR DEVELOPMENT

This invention was made with government support under Contract No. 1608344 awarded by the National Science Foundation. The government has certain rights in the invention.

BACKGROUND

Field of the Invention

The present disclosure is concerned with enhancing intracellular uptake of active agents by cells.

Description of Related Art

Therapeutic agent discovery in recent decades has produced a vast arsenal of anticancer agents, but there is a strong need to increase drug transport to cells. Microporation is a methodology to increase passive transport of macromolecules across membranes of living cells. The key step in microporation is to impose a physical (electrical, magnetic or mechanical) stimulus on the cells that will alter the permeability of the cell membranes due to its structural changes in response to this external provocation. Microporation techniques are actively used to transport genes, drugs, and cell nutrients to cells that otherwise are not available due to the low passive transport of these molecules. Electroporation techniques subject cells to electric fields to open up pores for drug delivery. For this purpose, high voltage applied between electrodes polarizes the membrane potential that is larger than 200 mV leading to formation of pores. This technique requires the close contact of an electrode pair for the administration of electric fields. Another technique called magnetoporation relies on the application of homogeneous static or pulsed magnetic fields for creating pores in the cell membrane. The basic principle of the technique is similar to the electroporation technique where the magnetic field causes polarization of the membrane resulting in irreversible electroporation. Sonoporation (cellular sonication), uses sound waves (typically ultrasonic frequencies) for modifying the permeability of the cell membrane. Piezoelectric transducers connected to bench-top function generators and acoustic amplifiers facilitate the application of sound waves. Sonoporation technique is limited by the tissue permeability of the sound waves. Converting electromagnetic energy to mechanical energy could be a potentially useful tool to stimulate biological systems for therapeutic purposes. It is well known that mechanical energy from (ultras)sound results in increased cell permeability, but its use is somewhat limited due to the loss transmission of sound waves in biological media.

Therapeutic agent discovery has reached a new plateau in recent decades, resulting in the assembly of a vast arsenal of anticancer agents. While these new agents have increased potency, the ability to target selective biochemical pathways has enhanced resistance to biological clearance, and has improved bioavailability. The current anticancer arsenal still lacks in one key critical aspect, cell targeting. Since the early 20th century, with the discovery made by Otto Heinrich Warburg, the use of glucose as a periphery attachment upon anticancer agents has been investigated and employed by numerous research laboratories and pharmaceutical industry in the aims of increasing drug uptake by cancer cells. While cancer cells do express glucose receptors in higher amounts in comparison to health/normal cells, the fact remains that the percentage of cancerous cells relative to normal cells is low. As such, the appendage of glucose upon anticancer agents has failed to provide the "holy grail" of targeted drug delivery to cancer cells in its most desired sense. However, the fact that glucose is taken up faster in cancer cells can be utilized in a combination strategy for targeted delivery.

There remains a need for new methods for targeted delivery of anticancer agents and other types of active agents.

SUMMARY

Described herein are methods of enhancing intracellular uptake of active agents by inducing temporary pore formation in cell membranes. The methods generally comprise targeting cells in vivo, ex vivo, or in cell culture with magnetic nanoparticles. The magnetic (metal) nanoparticles are configured to be selectively taken up by the cells into the interior of the cells to yield internalized magnetic nanoparticles. An active agent is also presented to the cells before, after, or simultaneously with the magnetic nanoparticles. A magnetic field is applied to the cells in such a manner to achieve targeted excitation of the internalized magnetic nanoparticles, which induces temporary pore formation in the cell membranes. This results in cells having temporarily increased permeability, such that the active agent is taken up in an increased amount and/or at an increased rate by the cells as compared to untreated cells. This process is generally illustrated in FIG. 1.

DESCRIPTION

Figure 1:
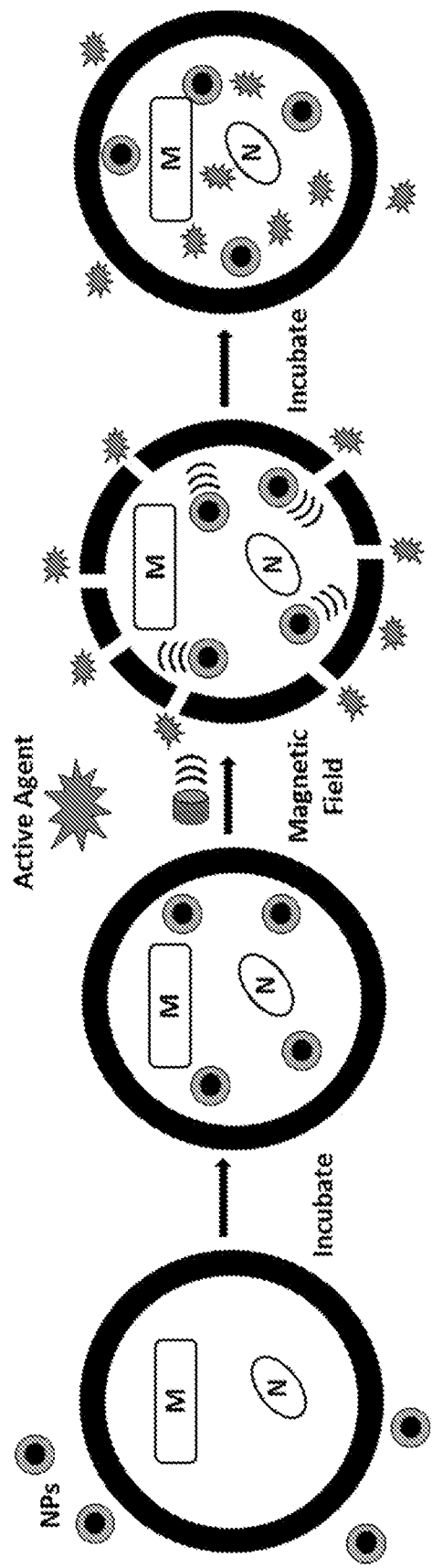
FIG. 1 is an illustration of the process for enhancing intracellular uptake of active agents by inducing temporary pore formation in cell membranes via nanoparticles (NP) transport, application of a magnetic field pulse, and pore formation for transport of the active agent into the cell.

In more detail, we have demonstrated here that the use of magnetic nanoparticles, optionally with targeting capabilities, in conjunction with magnetic fields achieve an increase in transport and accumulation of active agents within cells. In doing so, this synergist combination strategy allows for an increased penetration of agents into the cells, thereby allowing for enhanced concentration of the agent in a rapid fashion. As outlined in FIG. 1, cellular uptake of nanoparticles (NP) through the cell membrane (to the cell interior where the mitochondria (M) and nucleus (N) reside) is followed by a short magnetic field pulse. An active agent is also introduced before, after, or simultaneously with the nanoparticles. Upon being exposed to the magnetic field, a plurality of micropores form in the cell membrane, thereby allowing the active agent to travel within the cell. Upon termination of the magnetic field, the micropores seal, resulting in an increased concentration of the active agent within the cell to elicit its desired mode of action in a rapid fashion.

Various magnetic nanoparticles can be used, particularly colloidal magnetic nanoparticles. The term "nanoparticle" as used herein refers to metal nanocrystalline particles that can optionally be surrounded by a metal or nonmetal nanolayer shell. The nanoparticles can comprise any type of magnetic metal (iron, nickel, cobalt, gadolinium, dysprosium), or oxides, hydroxides, sulfides, or alloys thereof. Core/shell nanoparticles can be used and comprise a metal or metal alloy core and a metal shell (e.g., $Fe/Fe_3O_4$ core/shell). Ferromagnetic or ferrimagnetic nanoparticles are preferred. Superparamagnetic metal nanoparticles are particularly preferred, as they exhibit their magnetic behavior only when an external magnetic field is applied, enhancing their solubility and minimizing self-aggregation in solution. Even more preferably, the metal nanoparticles feature a strongly paramagnetic Fe core. Although larger nanoparticles (>150 nm) may be appropriate for some applications, preferably the nanoparticles have an average surface-to-surface dimension (e.g., diameter) of less than about 130 nm, more preferably less than about 100 nm, more preferably from about 20 nm to about 50 nm, and even more preferably from about 20 to about 30 nm. Larger nanoparticles are excreted by the body at a faster rate than smaller ones and may be more appropriate for in vitro/ex vivo inquiries, while smaller nanoparticles are better suited for in vivo studies. Nanoparticles can be custom synthesized, although various suitable nanoparticles are commercially available.

Figure 2:
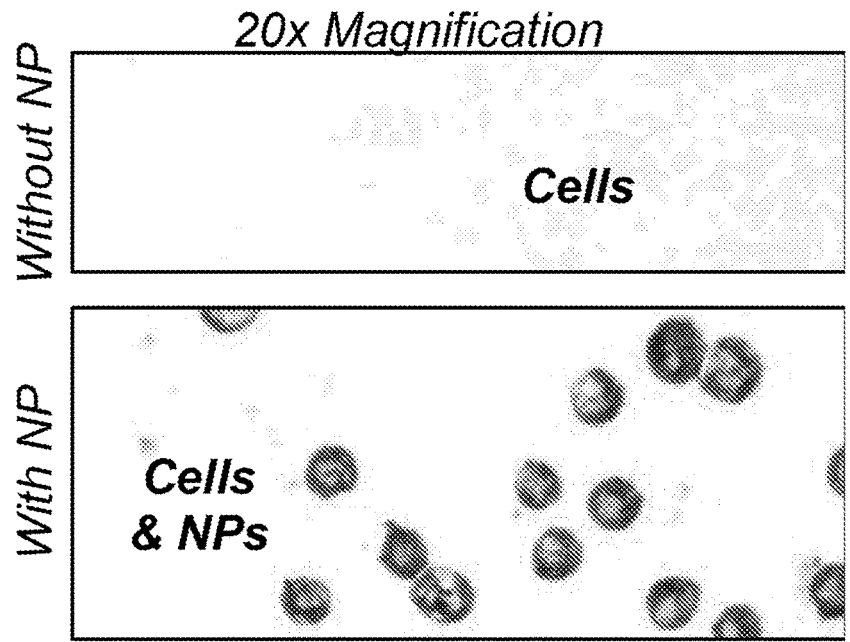
FIG. 2 shows images of cells incubated with and without nanoparticles to illustrate nanoparticle uptake, where the pink color is the counter stain for all cells, and the deep purple reflects the interaction of Prussian Blue with iron oxide nanoparticles taken up by the cells.
Figure 3:
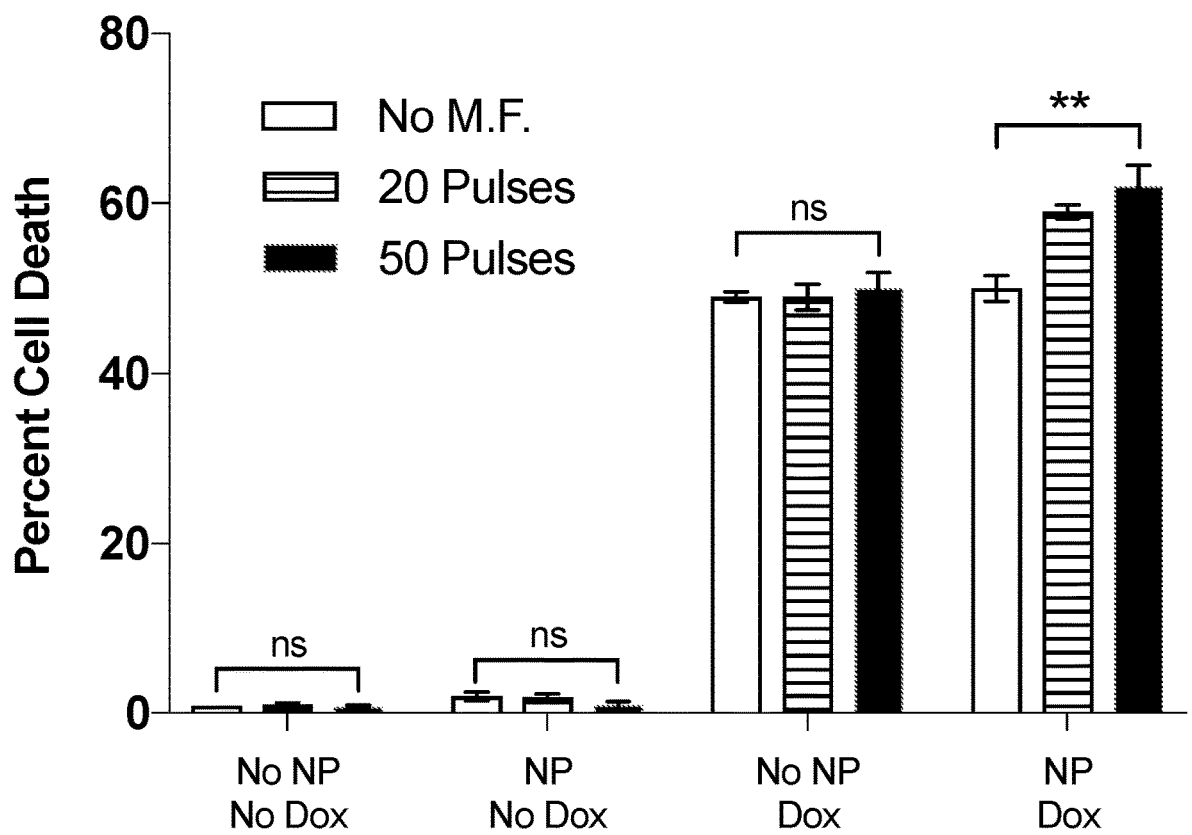
FIG. 3 is a graph showing the results summary of uptake the active agent, doxorubicin (Dox) with and without nanoparticles (NP) and in the presences or absence of a magnetic field pulse (M.F.).

In some embodiments, coated nanoparticles can be used. Uncoated nanoparticles may aggregate rather than act as individual nanoparticles, while coated nanoparticles reduce aggregation. Further, specific coatings can be designed based upon known techniques to facilitate nanoparticle uptake by the targeted cell type. For example, coated ligands can be selected for the targeted delivery to different cell types based upon biochemical differences in cell surface receptors. In some cases, even coated nanoparticles may be taken up by all cell types, but have a more rapid uptake by certain cell types (e.g., cancerous cells). Noting the Warburg effect, dextrin coated nanoparticles were chosen for the initial studies on the U-937 (lymphoma) cell line to take advantage of the overexpression of glucose receptors on cancerous cells. As such, cancerous cells uptake these nanoparticles at a faster rate than non-cancerous cells. Although non-cancerous cells can also uptake these nanoparticles, the externally applied magnetic field, with location targeting, makes this strategy an enhanced targeted approach. Magnetic nanoparticles are taken up, especially ones coated with glucose, in a rapid fashion by the target cells, as demonstrated in FIG. 2. Cells which do not uptake magnetic nanoparticles are stained pink, while cells that take up magnetic nanoparticles are stained deep purple via Prussian blue visualization.

It will be appreciated that there are multiple approaches that can be used to help increase the targeting properties of nanoparticles to cancer or other types of cells by using targeting moieties, coatings, etc. depending upon the type of cell targeted in the method. Non-limiting examples include the addition of targeting ligands upon the periphery of the nanoparticles, such as, but not limited to: folate and other essential substrates actively pumped into cells, antibodies, carbohydrate markers and analogs, aminosilane ligands, various charged functional groups, and targeting RNA/DNA ligands. The nanoparticles can be dispersed in a pharmaceutically-acceptable carrier for presentation to the cells. As used herein, the term "pharmaceutically-acceptable" means not biologically or otherwise undesirable, in that it can be administered to a subject, cells, or tissue, without excessive toxicity, irritation, or allergic response, and does not cause any undesirable biological effects or interact in a deleterious manner with any of the other segments of the composition in which it is contained. A pharmaceutically-acceptable carrier or excipient would naturally be selected to minimize any degradation of the nanoparticles, and to minimize any adverse side effects in the subject, cells, or tissue, as would be well known to one of skill in the art. Pharmaceutically-acceptable ingredients include those acceptable for veterinary use as well as human pharmaceutical use. Exemplary nanoparticle carriers and excipients include aqueous solutions such as normal (n.) saline (~0.9% NaCl), phosphate buffered saline (PBS), and/or sterile water (DAW), co-solvent mixtures of aqueous buffers and organic solvents (e.g. DMSO) and/or cyclodextrin (beta-cyclodextrin), and the like.

The active agents can be separately presented to the cells or can be conjugated to the nanoparticle or loaded into the cavities of the nanoparticles depending upon the desired application. The term "active agent" is used herein to refer to any compound or substance that produces a desired biological or physiological effect or change in the targeted cells, tissue, or whole organism, such as a therapeutic, prophylactic, cytotoxic, nutritional, or diagnostic effect. The term is used to differentiate the active agent from other components that may be present in a formulation, such as carriers, excipients, diluents, lubricants, binders, colorants, flavoring agents, and the like. The active agent may be synthetic or derived from a naturally occurring source (or a combination thereof). Exemplary active agents include any kind of bioactive molecules, therapeutics, prophylactics, antibiotics, cytotoxic compounds, chemotherapeutics, diagnostic agents (image contrast agents), and the like, such as small molecule drugs, macromolecules, biologics (peptides, proteins, antibodies, antigens, epitopes), nucleotides (DNA, plasmid DNA, RNA, siRNA, mRNA), nutritional supplements, nutraceuticals, analgesics, anti-inflammatory agents, and the like, as well as pharmaceutically acceptable salts thereof.

The inventive approach is particularly suited for macromolecules (greater than about 5,000 Daltons) that otherwise would not cross or have difficulty crossing the cell membrane (ether passively or via active transport), including peptides and small proteins. The active agent can be formulated in a variety of ways consistent with the route of administration and targeted condition or inquiry, and compatible with the active agent itself. In one or more embodiments, the formulation comprises a therapeutically-effective amount of active agent dispersed in a pharmaceutically-acceptable carrier or excipient. As used herein, a "therapeutically effective" amount refers to the amount of the active agent that will elicit the biological or medical response of a tissue, system, animal, or human that is being sought by a researcher or clinician, and in particular elicit some desired therapeutic effect. For example, in one or more embodiments, a therapeutically effective amount of active agent is an amount sufficient to kill or otherwise destroy the cancerous tissue. One of skill in the art recognizes that an amount may be considered therapeutically effective even if the condition is not totally eradicated but improved partially. As noted, due to the enhanced uptake of the active agent by the target cells, lower amounts of the active agent may be required to achieve the desired therapeutic efficacy. Exemplary active agent carriers and excipients include aqueous solutions such as normal (n.) saline (~0.9% NaCl), phosphate buffered saline (PBS), and/or sterile water (DAW), oil-in-water or water-in-oil emulsions, partial organic (e.g. DMSO) mixed solvents with aqueous buffers, and the like.

Once the nanoparticles have been taken up by the targeted cells for a sufficient period of time, and the active agent has been introduced into the vicinity of the cells, the magnetic field (pulses) can be applied. Preferably, an alternating and pulsed inhomogeneous magnetic field is used to increase transport and accumulation of the active agent in the targeted cells. By definition, in an inhomogeneous magnetic field, the magnetic field strength changes over distance, which is characterized by the magnetic field gradient 800 Tesla/m. For an inhomogeneous field, the field strength is localized or focused at a targeted area (generally the center area of the pulse) and then decreases as a function of distance. In this manner, the perimeter of the pulse area will not be as strong as the center/target area, such that the magnetic field is stronger and more focused in the center of the targeted area, thus reducing off-target effects (e.g., such as in the healthy tissue area surrounding a targeted tumor). Each pulse applies an inhomogeneous magnetic field. The time for each pulse is approximately 500 microseconds. Subsequent magnetic pulses are applied to the target with a 20-30 second gap or pause between pulses for a required cooldown. Thus, for a total 20 pulse treatment protocol, the total time is approximately 7 minutes. Updates or optimizations to the machine used to generate the pulses can shorten this time. In practice, the total treatment time for 20 to 50 pulses is preferably less than 10 minutes, more preferably about 5 minutes or less, with an ideal target time to be about 30 seconds to 1 minutes using an optimized machine and settings. While the magnetic field apparatus generates mainly inhomogeneous magnetic fields producing a strong magnetic field gradient, the presence of strong magnetic fields and its effects will/can also contribute to microporation in cells.

The magnetic field provides targeted excitation of the internalized nanoparticles generating ultrasound waves and resulting in microporation in the cells (locally-induced sonoporation). Microporation induced by inhomogeneous magnetic pulse via a magnetic field gradient (and intense magnetic field via magnetostriction effects) and nanoparticles localizes the effect around the nanoparticles, reducing off-target effects. Moreover, the magnetic field attenuation in biological tissue is more favorable than ultrasound-induced microporation.

The formation of pores or micropores (openings) in the cell membranes results in the cells having a temporarily increased permeability, enhancing the concentration and/or the speed of uptake of the active agent, and in particular facilitating passive transport of the active agent across the cell membrane lipid bilayer through these temporary pores. In one or more embodiments, the process results in an increased intracellular uptake of the active agent by at least 5%, preferably at least 20%, more preferably at least 60% as compared to untreated control cells (i.e., cells that have not been exposed to the nanoparticles and/or the magnetic field pulse). When the magnetic field is removed, the pores close or seal up again, trapping the active agent within the cells so that the active agent can take effect on the targeted cells according to the desired mode of action. In one or more embodiments, the process results in an enhanced efficacy of the active agent by at least 5%, preferably at least 20%, more preferably at least 50% as compared to untreated control cells. As used herein, "enhanced efficacy" refers to an increase or improvement in the action or activity of the active agent as compared to its activity or action in control cells that have not been exposed to the nanoparticles and/or the magnetic field pulse. As shown in the data, the methodology enhances the effects of the anti-cancer agents (doxorubicin) by up to 65%.

Although inhomogeneous magnetic fields are exemplified herein, inhomogeneous and homogeneous magnetic fields both generate ultrasound, therefore the nanoparticle-facilitated local sonoporation could be achieved using either type of magnetic field. It will be appreciated that any device that can provide the magnetic field gradient with similar frequency range and pulse would be useable for this purpose.

Figure 4:
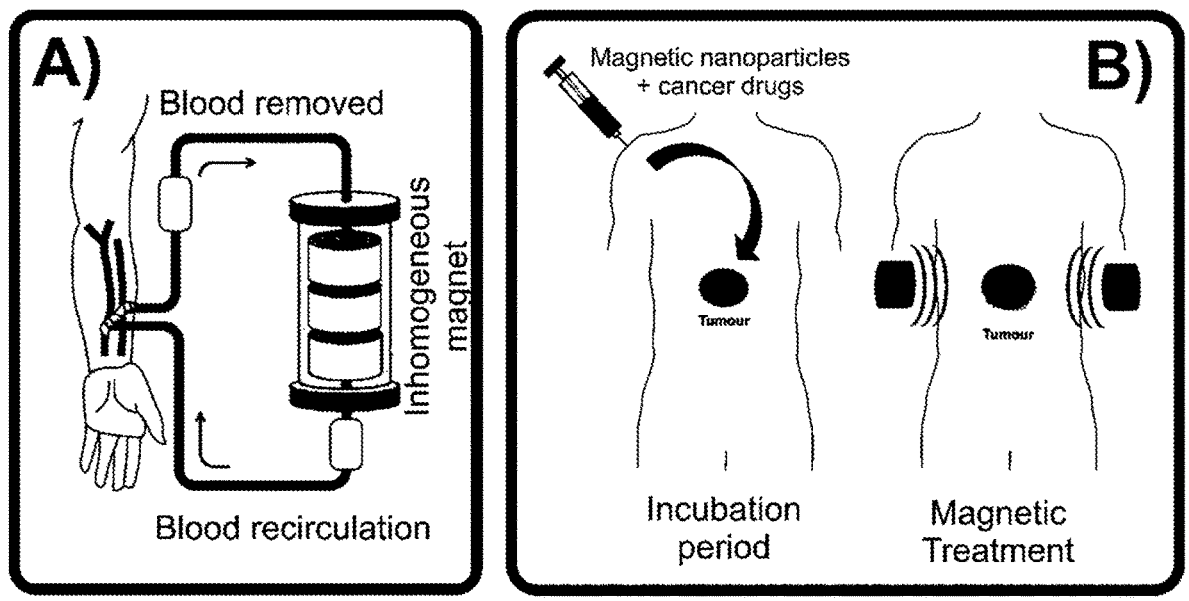
FIG. 4 is an illustration of (A) ex vivo application of the magnetic field/nanoparticle enhanced uptake of active agents in a patient's blood, such as to treat blood cancer; and (B) in vivo application of the magnetic field/nanoparticle enhanced uptake of active agents in a patient's body, such as to treat tumours.
Figure 5A:
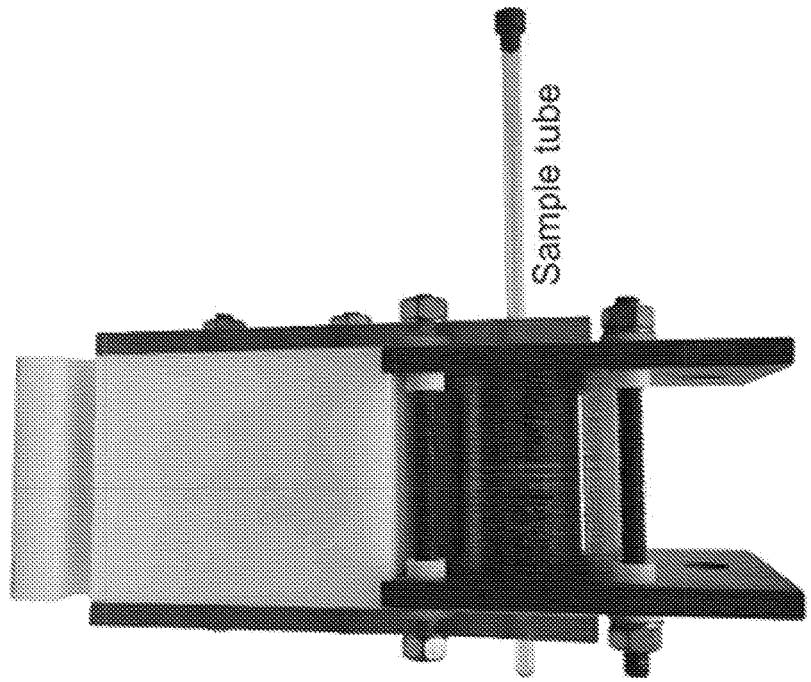
FIG. 5A shows the Anti Helmholtz coil used in the experiments.
Figure 5B:
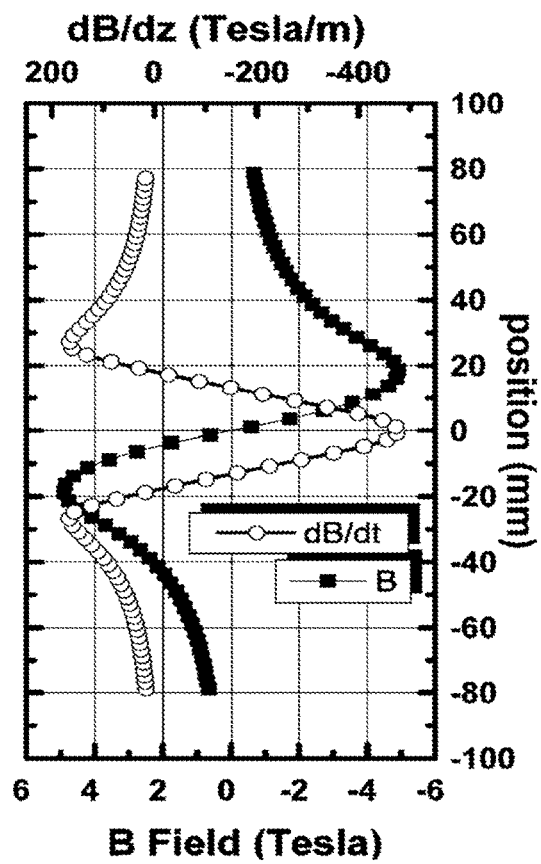
FIG. 5B shows the magnetic field and magnetic field gradient of the coil.
Figure 5C:
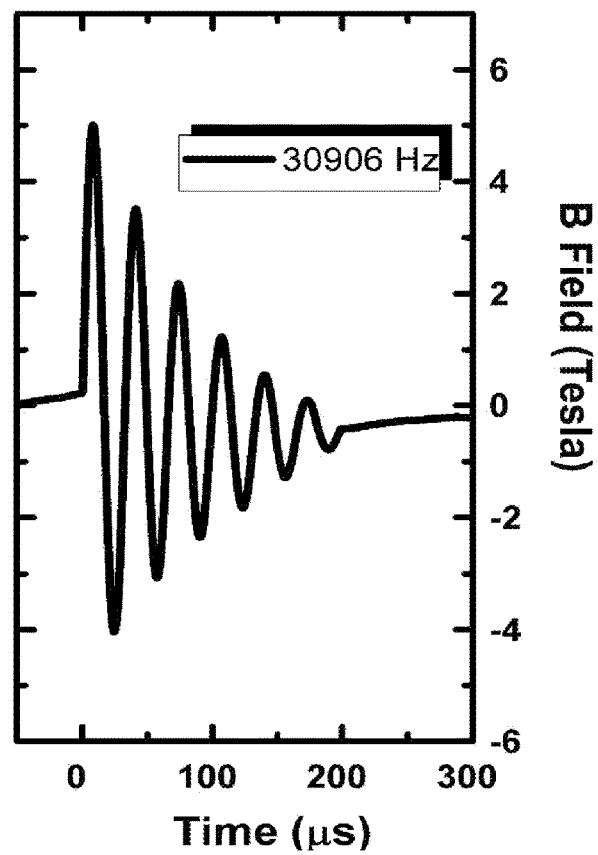
FIG. 5C shows the time dependence of the peak magnetic field in the coil.
Figure 5D:
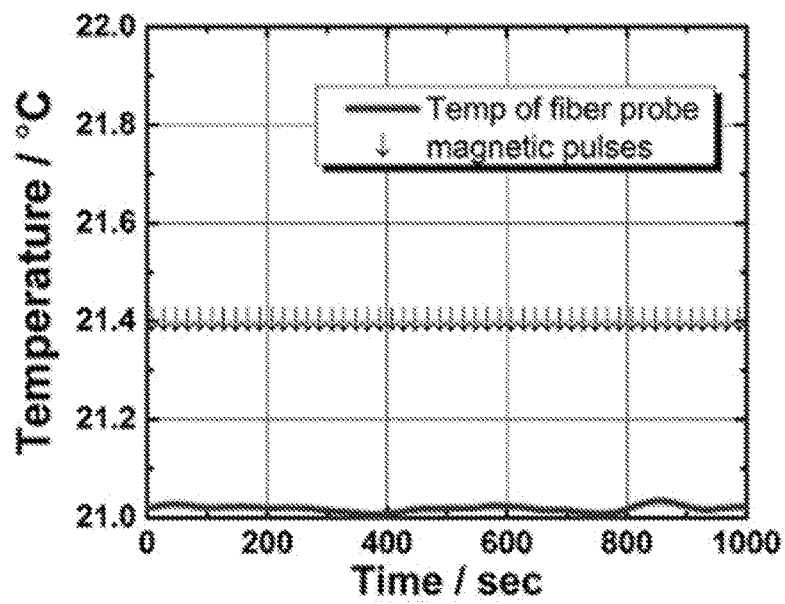
FIG. 5D shows the temperature stability of the cell buffer during application of magnetic pulses.

It will be appreciated that the methodology can be applied to treat various forms of blood cancer if the blood, magnetic nanoparticles, and anti-cancer agents are circulated outside the human body through a high frequency inhomogeneous magnet as illustrated in FIG. 4(A). Alternatively, tumors can be treated inside the human body with the help of a magnetic coil that is capable of producing high frequency inhomogeneous magnetic pulses directed at the tumors cells in the presence of drugs and magnetic nanoparticles as illustrated in FIG. 4(B).

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Enhancing Drug Delivery to Cancer Cells: The Effect of Combining Inhomogeneous Magnetic Fields with Magnetic Nanoparticles This work demonstrates that the drug transport of Doxorubicin into cells in the U-937 cancer line is increased 75.2% when the cells are exposed to few hundred Tesla/m inhomogeneous magnetic pulses in combination with magnetic nanoparticles. This work demonstrates how to combine sonoporation with magnetoporation for enhancing drug transport into cells. Herein we demonstrate the combined use of inhomogeneous pulsed magnetic fields with magnetic nanoparticles to generate sound waves locally for sonoporation. A key advantage of this approach is that the magnetic fields are not attenuated the same extent as sound waves. Therefore, we are able to use sonoporation in areas of the body that were not available with pure sonoporation techniques. In addition, the use of magnetic particles with specific ligands enables us to develop molecularly targeted microporation techniques. While both sound waves and magnetic fields affect the cells, their individual impact is minimal, and it is the interaction of these two aspects that leads to successful microporation of the cell membrane.

The inhomogeneous magnetic field induces transitional motion on the magnetic particles leading to pressure fluctuation in a liquid. The sound wave generated from the internalized magnetic nanoparticles leads to changes of permeability in lipid bilayers resulting in increased transport of small molecules.

As shown in FIG. 5, a pulsed power generation system that produces underdamped oscillatory pulsed currents was built for use as the magnetic field generator. The current source is turned on with the help of a triggered high voltage switch. The current in the circuit oscillates and its oscillation frequency corresponds to the resonant frequency of the RLC circuit (30906 Hz). The current source is connected to a coil producing an inhomogeneous magnetic field. The inhomogeneous magnetic field is generated from an anti-Helmholtz coil. In the anti-Helmholtz coil, the arrangement of the coil pair is such that the current flow produces magnetic fields opposing each other in the individual coils. This arrangement of coil pairs yields magnetic fields that are rapidly changing in the center of coil with respect to the horizontal dimension. In this work, the samples were placed inside an NMR tube for exposing the cells to the inhomogeneous magnetic fields.

One aspect of the technology proposes to combine glucose mediated delivery with that of nanoparticle delivery methods: the use of a dextrin coated nanoparticle that will allow for enhanced uptake into cancer cells. While normal cells can also uptake this dextrin-NP, the use of an external magnetic field will have achieved targeted excitation of nanoparticles within cells for the formation of micropores. The external magnetic field, which can be directed as the specific area desired for treatment, imparts the targeting arm of this proposed approach. Nanoparticles within the cell interior can only induce microporation in the presence of magnetic field pulses. Cells with, or without, nanoparticles that are not subjected to magnetic pulses do not form micropores. As such, there will be no additional transport of agents into the cell's interior. Building upon this, it is proposed that dextrin (glucose) coated nanoparticles will impart an enhanced uptake of the nanoparticles, and the external magnetic field can be targeted to a specific area for the nanoparticle-facilitated microporation that will allow for an enhanced movement of cytotoxic agents from the exterior to the interior of cells. Upon termination of the magnetic field, the micropores will seal resulting in an increased concentration of the therapeutic agents to elicit its mode of action.

Determination of Dextrin-Coating Nanoparticle Concentration

The bio-distribution and availability of iron-oxide nanoparticles (FeNP) have been well characterized by numerous research programs. The cellular uptake of these FeNPs is well established, and surface modification of the nanoparticle coating can translate into further enhanced uptake into cells. While these surface modifications do impart greater cellular uptake, the inclusion of these new "groups" can alter the relatively benign nature of FeNP, as such any coated systems require basic toxicity screens within the cell lines being investigated. Dextrin coated FeNP (Dex-FeNP), benign within the body, were chosen for this project in the aims of maximizing uptake via glucose receptor-mediated endocytosis, in view of the increased glucose receptor expression upon cancer cells. To evaluate the proposed magnetic field facilitated nanoparticle induced microporation, U-937 (lymphoma cancerous suspension cell line) was selected. To investigate the possible toxicity effects of Dex-FeNP within U-937 cells, doxorubicin was used as an evaluation tool. Through the comparison of the $IC_{50}$ of doxorubicin in U-937 cells relative to the $IC_{50}$ of doxorubicin in the presence of various concentration of the Dex-FeNP allows for direct comparison of the effects that the Dex-FeNP have upon U-937 cells. In addition to the concentration of the Dex-FeNP, the effects of cell seeding density was also investigated in 384 and 48-well plates (4,000 and 40,000 cells/well, respectively). Table 1 outlines the $IC_{50}$ of doxorubicin in both cell density experiments at various concentration of the Dex-FeNP (0 to 0.000001 mg/mL, final concentration in the well).

TABLE 1

Assessment of dextrin nanoparticle concentration as a functionof $IC_{50}$ alteration of Doxorubicin in U-937 (histiocytic lymphoma) human cancer cell line after 48 h exposure.

| Dextrin Nano-Particle (mg/mL) | Doxorubicin $IC_{50}$ 4,000 cells/well, 384 plate, 50 µL volume | ($\mu$M) in U-937, 48 h 40,000 cells/well, 48 plate, 700 µL volume |
|---|---|---|
| 0 | 0.023 ± 0.012 | 0.201 ± 0.032 |
| 0.25 | 4.19 ± 0.95 | 6.25 ± 0.208 |
| 0.01 | 3.44 ± 0.56 | 4.83 ± 0.028 |
| 0.0025 | 0.018 ± 0.009 | 0.20 ± 0.019 |
| 0.001666 | 0.018 ± 0.012 | 0.20 ± 0.027 |
| 0.00125 | 0.022 ± 0.008 | 0.32 ± 0.022 |
| 0.001 | 0.018 ± 0.014 | 0.19 ± 0.035 |
| 0.0001 | 0.018 ± 0.011 | 0.17 ± 0.024 |
| 0.000001 | 0.022 ± 0.019 | 0.20 ± 0.079 |

$IC_{50}$ values (µM) as determined by Alamar Blue Quantification.
Error is standard deviation of the mean, n = 9; $IC_{50}$ = half maximal inhibitory concentration.

When higher concentrations of the Dex-FeNP (0.25 and 0.01 mg/mL) were employed, the $IC_{50}$ of doxorubicin actually increased in value significantly relative to the doxorubicin control alone. It has been suggested that glucose is cleaved from the Dex-FeNP upon uptake, resulting in increased cell growth; thereby, it decreases the efficacy of doxorubicin, which results in the increase $IC_{50}$ value. The FeNP particles themselves have also been reported to interfere with cellular viability assays at high concentrations, such as Alamar blue that was employed in these investigations. When Dex-FeNP was employed with dilutions of 1/400 (0.0025 mg/mL), the $IC_{50}$ of doxorubicin returned to normal levels within the margins of standard deviation in both cell density experiments. Additionally, when U-937 cells were grown in the absence or in the presence of Dex-FeNP (0.0025 mg/mL final concentration), there was no difference in cellular viability and growth, within the statistical deviation limits.

It can be concluded that the use of Dex-FeNP at a final concentration of 0.0025 mg/mL or lower does not have any confounding effect upon cellular growth and viability.

Visualization of Nanoparticle Uptake within U-937 Cells

Figures 6A, 6B, 6C, 6D:
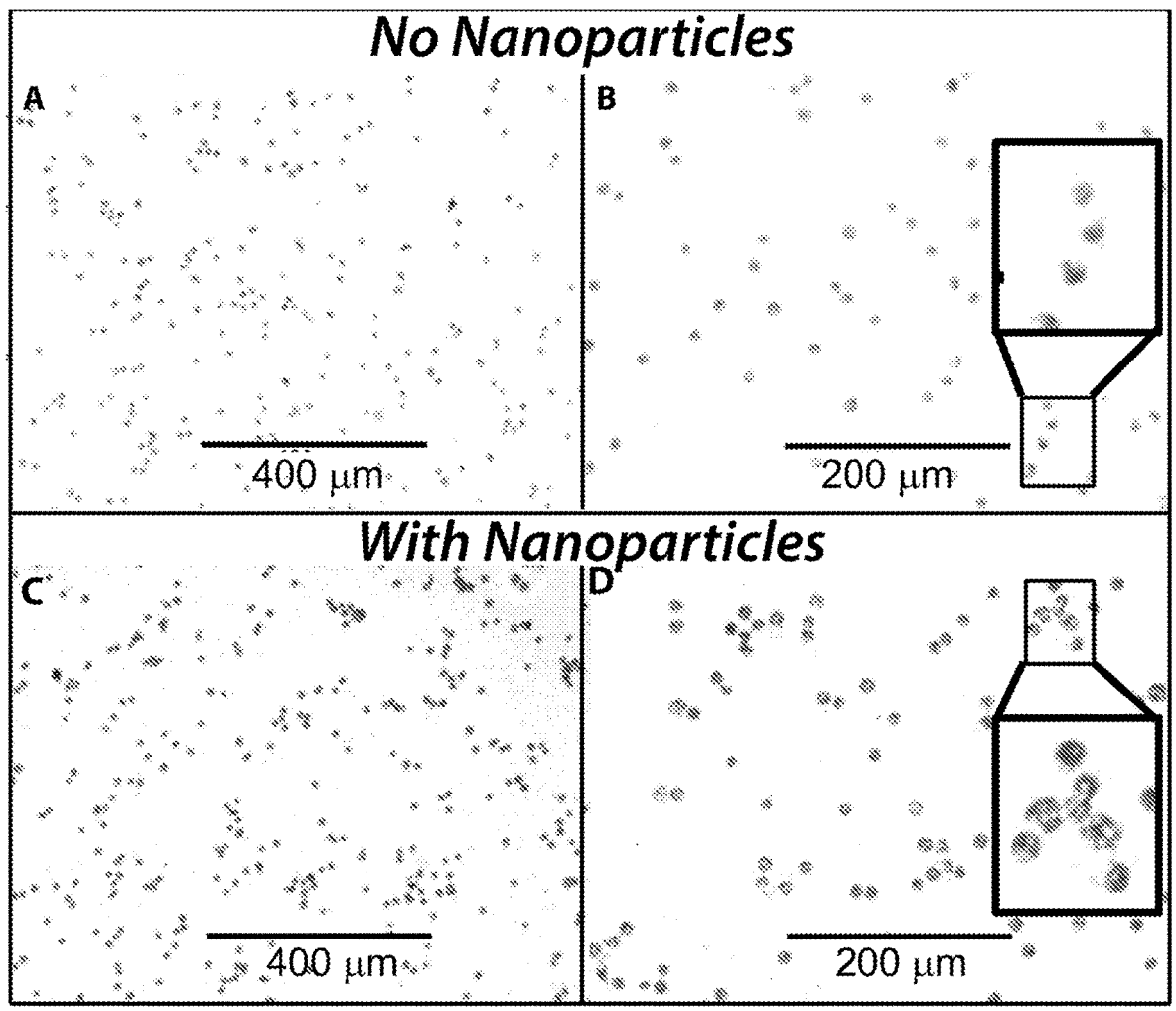
FIG. 6A-6D shows images of the uptake of dextrin coated nanoparticles in U-937 human cancer cell line. A&B represent the control-absence of nanoparticles, and C&D the uptake. Scale bars: 400 µm in A&C and 200 µm in B&D.

Given the ability to increase the concentration of active agents within target cells, as in the case of doxorubicin, a lower concentration can be administered to achieve the same therapeutic effect currently used, but with decreased associated toxic side effects due to lower dosages being employed. The critical aspect in this strategy is that the nanoparticles are present within the cell rather than adsorbed onto the exterior. As such, investigations were conducted to visualize that the Dex-FeNPs are present within the interiors of U-937 cells. Following standard procedures, U-937 cells were seeded at 40,000 cells/well in 48-well plates. Dex-FeNP was added to the cell media. Media alone was used for the blank control. All samples were incubated for 24 hours. Afterwards, cells were isolated, washed with PBS to remove any nanoparticles adhered to the outer surface of the cells. Cells were fixed by cold methanol, incubated in the presence of Prussian blue, and then counter stained with Nuclear Fast red. Visualization was performed under bright field transmission. Prussian blue stains the iron-oxide core of the Dex-FeNP blue, whereas the Nuclear Fast red stains cellular membranes. In FIG. 6A/B, the visualization of U-937 cells in the absence of Dex-FeNP, shows only the effects of the Nuclear fast red stain upon the cellular membrane. No blue coloration was observed within their interiors. FIG. 6C/D shows that when U-937 cells were treated with Dex-FeNP, there was a clear blue coloration within the cells indicating uptake of the NP. It is worthy to note the lack of blue coloration on the exteriors of the cellular membranes, highlighted in red by the Nuclear fast red stain. This experiment demonstrates that the cells effectively uptake the nanoparticles.

Figure 6E:
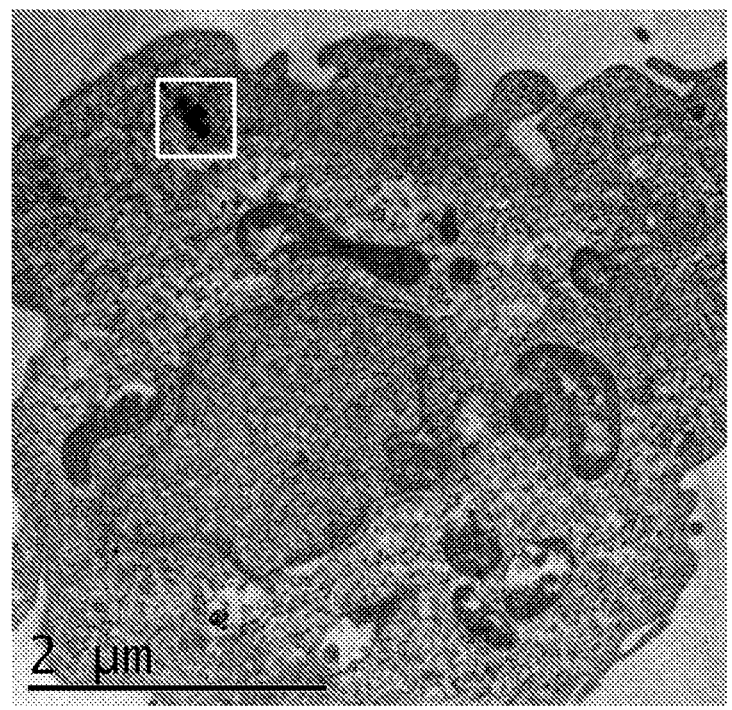
FIG. 6E is a TEM image of a U-937 cell, showing nanoparticle uptake. Cells were seeded at 40,000 cells/well in a 48 well plate, incubated with the nanoparticles at a final concentration of 0.0025 mg/mL for 24 h.
Figure 6F:
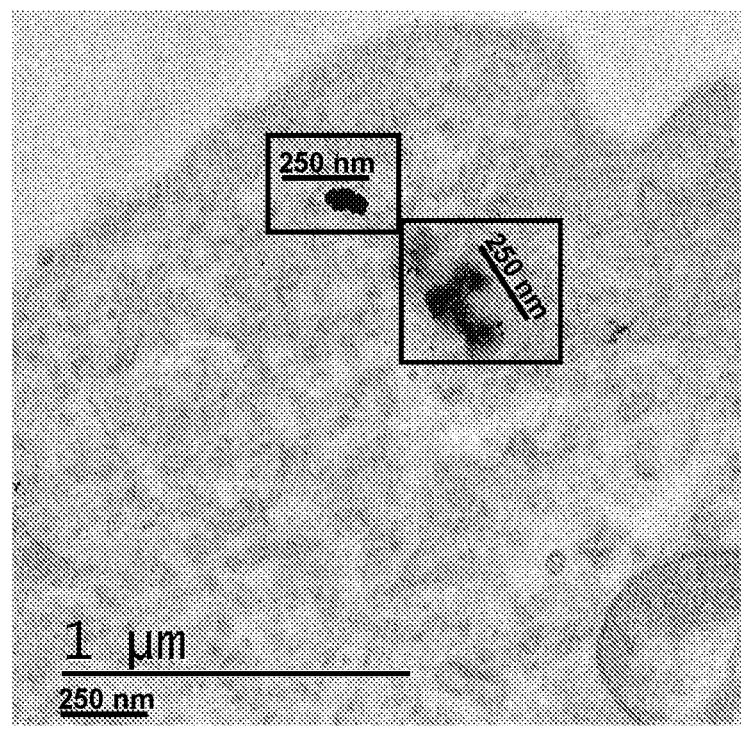
FIG. 6F is the TEM image of the white box from FIG. 6E enlarged showing two nanoparticle clusters taken up by the cell.
Figure 6G:
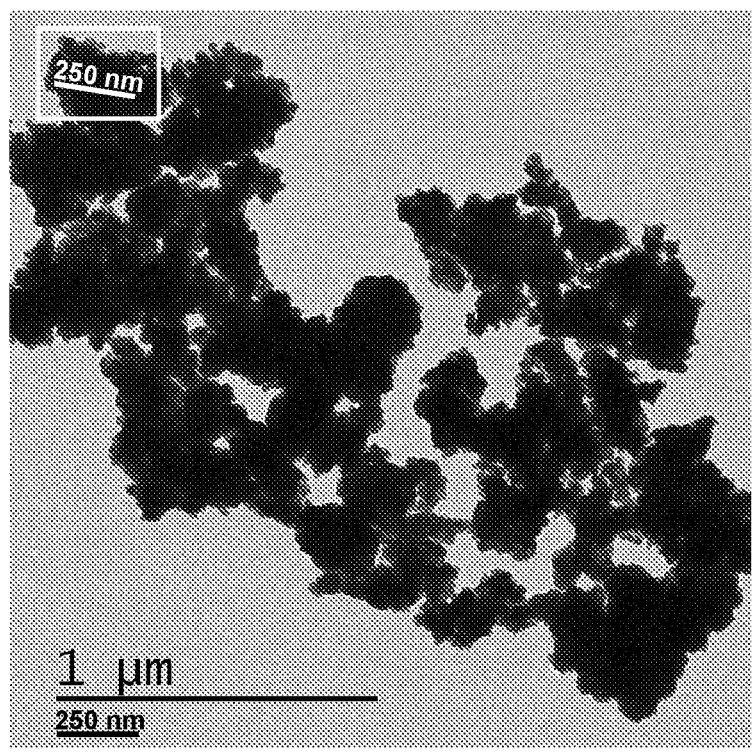
FIG. 6G is an enlarged TEM of an individual nanoparticle cluster.

Further, validation of Dex-FeNP uptake within U-937 cells was shown by TEM. FIG. 6E shows a U-937 cell that was visualized after Dex-FeNP incubation (0.0025 mg/mL), the highlighted red box is enlarged in FIG. 6F. Within FIG. 6F, two Dex-FeNP clusters are observed. Imaging of just the Dex-FeNP (FIG. 6G), shows the same cluster sizes of particles observed in the U-937 cells.

Effects of Magnetic Fields and Nanoparticles on Doxorubicin Facilitated Cell Death To explore the effects of an inhomogeneous magnetic field, herein referred to as pulses, the only limitation present was that of the pulse generation system's diameter in which samples can be placed. While ideal cell culturing techniques employ sterile culturing flasks, none of the current flasks on the market meet the diameter requirements of the pulse generating system. To circumnavigate this, the use of a standard 5-mm NMR tube capable of being sterilized was chosen as it fits within the pulse generating area. In this, it was necessary to transfer the cell suspension to the NMR tube. While transferring the cells will not affect their viability, the question that must be addressed is if cellular viability will be affected in this non-ideal culturing environment.

Figure 7:
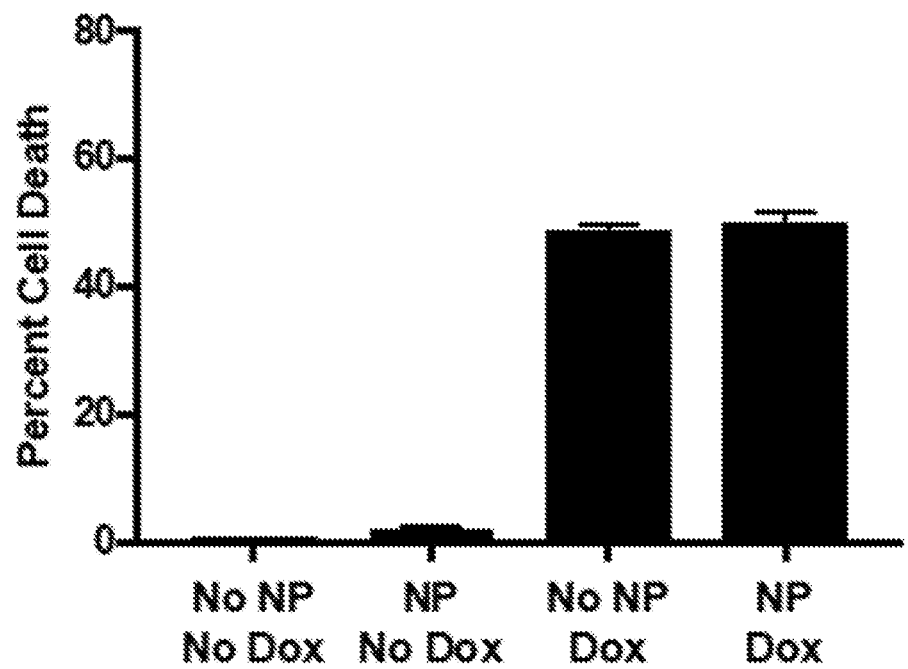
FIG. 7 shows the effects on U-397 cell death in the presence/absence of Dex-FeNP and Dox. No magnetic field pulses were applied. Percent cell death of was relative to control samples of just U-397 cells (first column), as determined by Alamar Blue Quantification. Error is standard deviation of the mean, n≥9 (triplicate of triplicates).

No Magnetic Pulses: Effects of Cell Suspension Transfer, and Presence or Absence of Doxorubicin and Dex-FeNP upon Cell Death in U-937—The effects of cell suspension transfer to the 5 mm tube was investigated. U-937 cells (40,000 cells/well) were cultured in the presence or absence of Dex-FeNP (final concentration of 0.0025 mg/mL), and in the presence or absence of doxorubicin (at the determined $IC_{50}$ in U-937), and then transferred to the 5-mm NMR tube. Samples were left at room temperature for the same time duration as samples treated to magnetic pulses. Samples were returned to cell culture plates and then incubated for 2 hours, and finally evaluated for cell death. FIG. 7 shows that there was no significant cell death when the cell suspension was transferred to and from the NMR tube in the absence of Dex-FeNP, doxorubicin and magnetic pulses. When Dex-FeNPs were introduced, there was a non-significant increase in cell death within the limits of deviation. Based upon these two experiments, there seems to be insignificant cell death resulting from the cell suspension transfer to and from the NMR tube. When doxorubicin is introduced, in the absence of Dex-FeNP and magnetic pulses, cell death increased to over 50%, which was expected given its $IC_{50}$ in these experiments. When both doxorubicin and Dex-FeNP were employed cell death remained similar, within statistical limits, to that of just doxorubicin.

Transferring the cell suspension to and from the 5-mm NMR tubes to be used for magnetic pulse application, has no significant effect upon cell viability. Furthermore, in the absence of magnetic pulses, there is no change in the cytotoxicity of doxorubicin in the presence or absence of Dex-FeNP. As such, it can be concluded that the Dex-FeNP have no effect upon doxorubicin or cell death in the absence of magnetic pulses.

Figure 8:
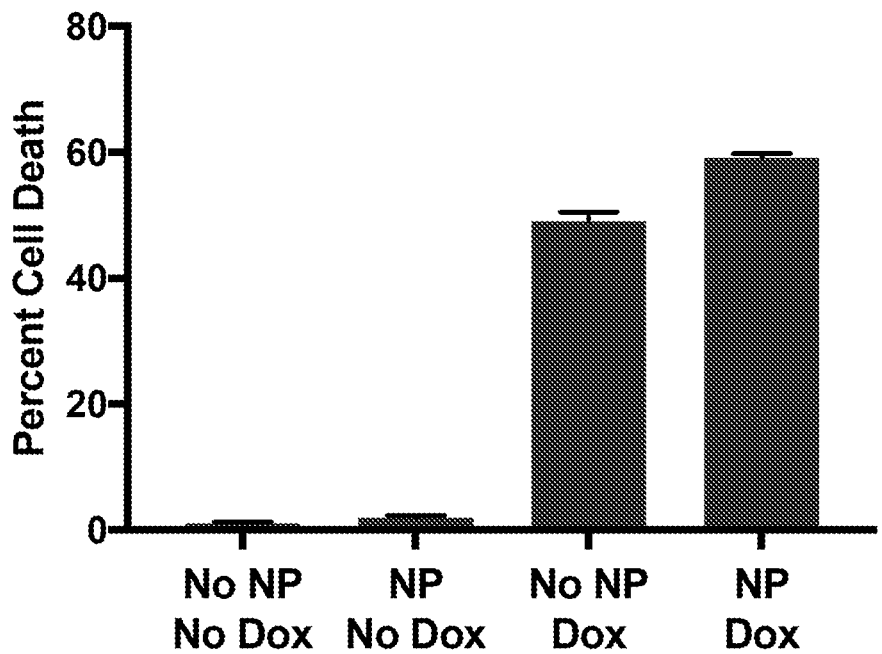
FIG. 8 shows the effects on U-397 cell death in the presence/absence of Dex-FeNP and Dox. Samples subjected to 20 magnetic field pulses. Percent cell death was relative to control samples of just U-397 cells (first column), as determined by Alamar Blue Quantification. Error is standard deviation of the mean, n≥9 (triplicate of triplicates).

20 Magnetic Pulses: Effects of Presence or Absence of Doxorubicin and Dex-FeNP upon Cellular Death in U937— To explore the effects of microporation upon cell death through the application of magnetic pulses upon Dex-FeNP, the same experimental protocol as outlined above for no pulses was performed, but with the application of 20 magnetic pulses to the sample to induce increased drug uptake and enhanced accumulation. The total time required for this single set of 20 pulses is 5 microseconds. During the 5 microseconds, the field is applied constantly, but after this time no further pulses are applied. Microporation occurs as a result of the pulses, the pores formed allow for the increased drug uptake, and then the pores "heal" to return the cell back to its "normal" state. Cell death increased by approximately 1% in the absence of doxorubicin and Dex-FeNP when 20 magnetic pulses were applied. When 20 pulses were applied, the pattern of cell death matches that of when no pulses were applied, within statistical deviation, as shown in FIG. 8. The difference in the application of magnetic pulses is observed only when both Dex-FeNP and doxorubicin are employed. Given that cell death in the absence of Dex-FeNP is statistically the same in the presence and in the absence of magnetic pulses, it can be concluded that the Dex-FeNP and magnetic pulses together contribute to the increased cytotoxicity.

Figure 9A:
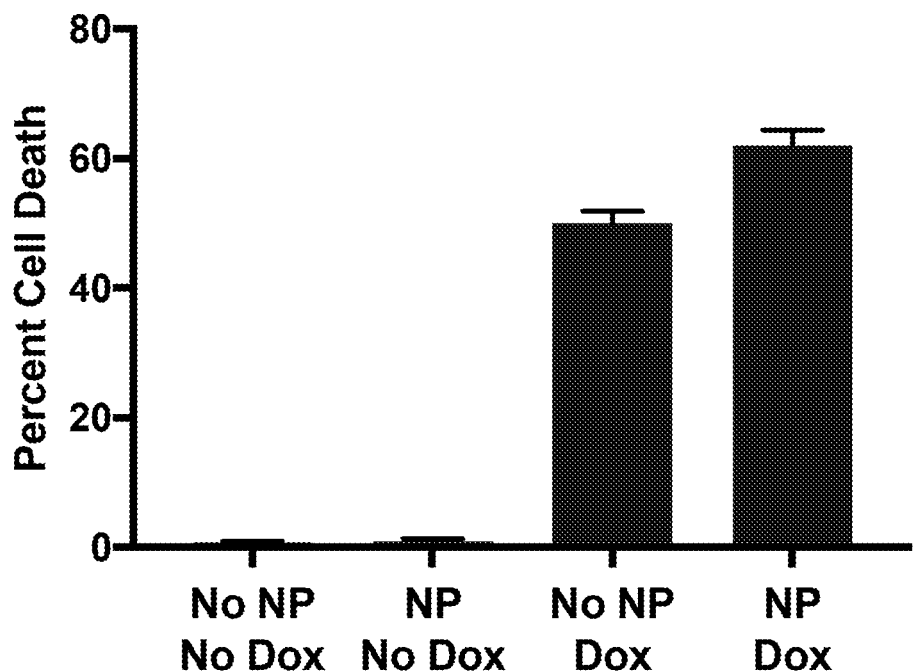
FIG. 9A shows the effects on U-397 cell death in the presence/absence of Dex-FeNP and Dox. Samples subjected to 50 magnetic field pulses. Percent cell death was relative to control samples of just U-397 cells (first column), as determined by Alamar Blue Quantification. Error is standard deviation of the mean, n≥9 (triplicate of triplicates).
Figure 9B:
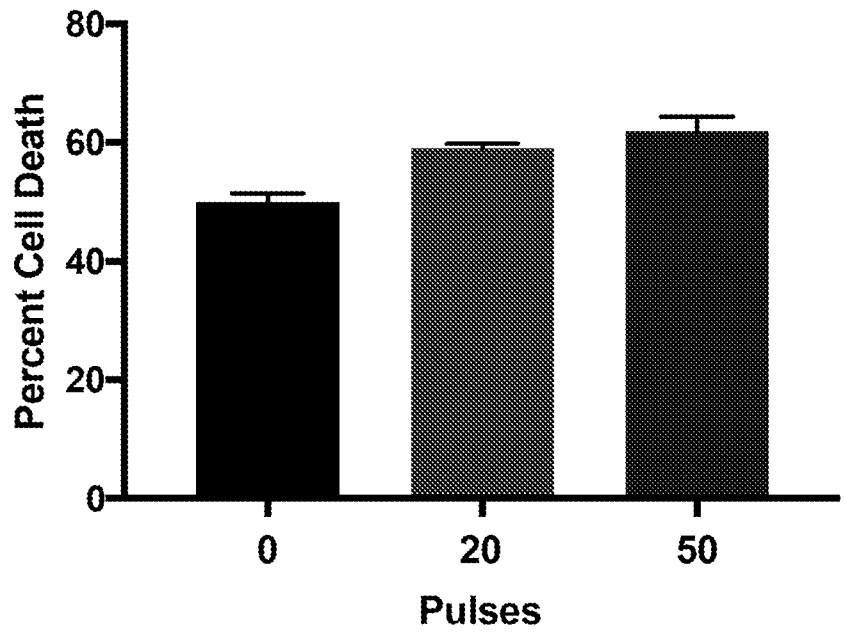
FIG. 9B shows a side-by-side comparison of the effects of magnetic pulse quantity on cell death in the presence of Dex-FeNP and dox.

50 Magnetic Pulses: Maximizing Cell Death with Magnetic Pulses—To maximize the combinational cell death in this strategy, the number of magnetic pulses was increased. As with 20 pulses, there was no increase in cell death without doxorubicin or without Dex-FeNP. Similar to when 20 pulses were applied to cell suspension with Dex-FeNP and doxorubicin, there was an increase in cell death when 50 pulses were applied (FIG. 9A). Direct comparison of the effects of pulses upon cell death in the presence of DOX/NP and magnetic fields does show a greater percentage of cell death with higher pulses (FIG. 9B). Notably, however, a 2.5 increase in pulse application did not result in a 2.5-fold increase in cell death.

An increase in U-937 cell death of 9.1% is observed when all three elements: doxorubicin, Dex-FeNP, and magnetic pulses are present. There is no increase in the cytotoxicity of doxorubicin in the absence of either magnetic pulses or Dex-FeNP. This demonstrates that the magnetic field induces oscillatory motion in the FeNP that translates into micropore formation leading to an increase in doxorubicin uptake and subsequent cell death. To date, there is no reported combinational therapy that employs both inhomogeneous magnetic fields and FeNP that translates to increased cell death.

Figure 10A:
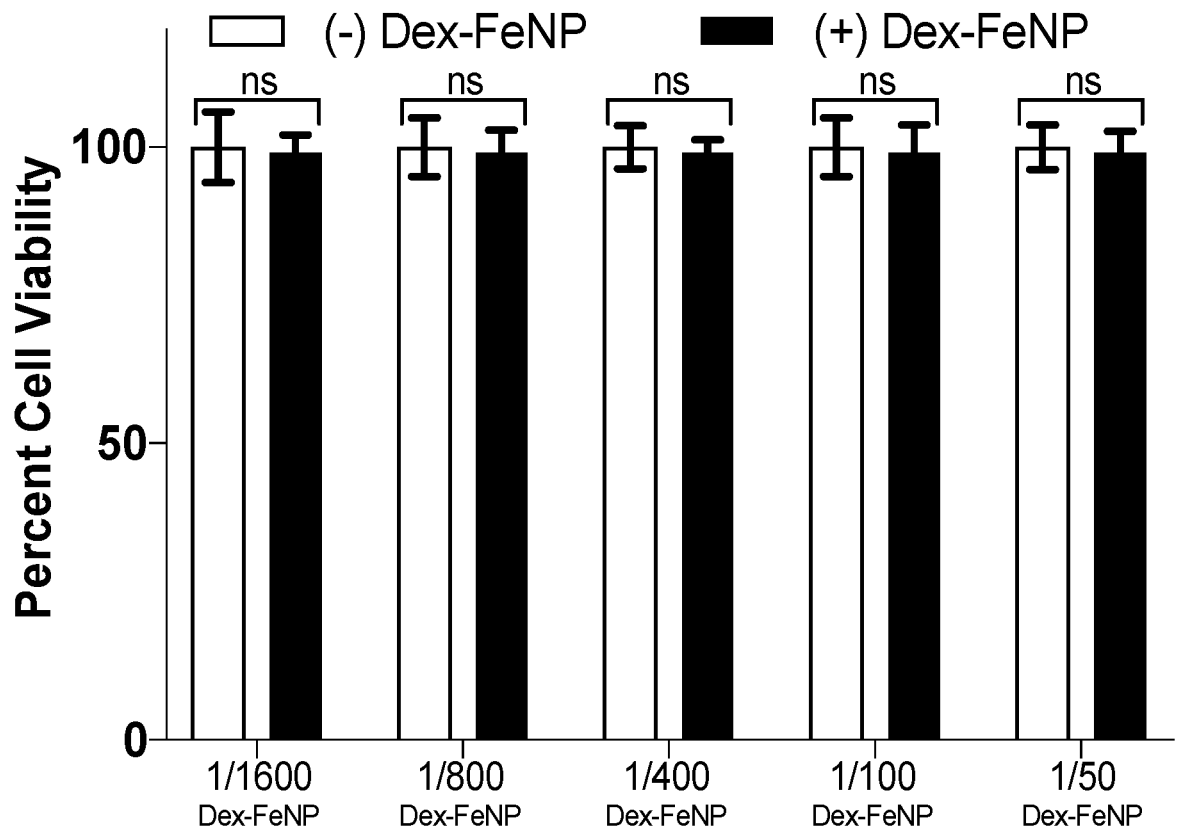
FIG. 10A shows that the FeNP themselves possess no cytotoxicity properties, as evaluated in U-937 cells over a 72-h period. Error is standard deviation of the mean, n≥9 (triplicate of triplicates).
Figure 10B:
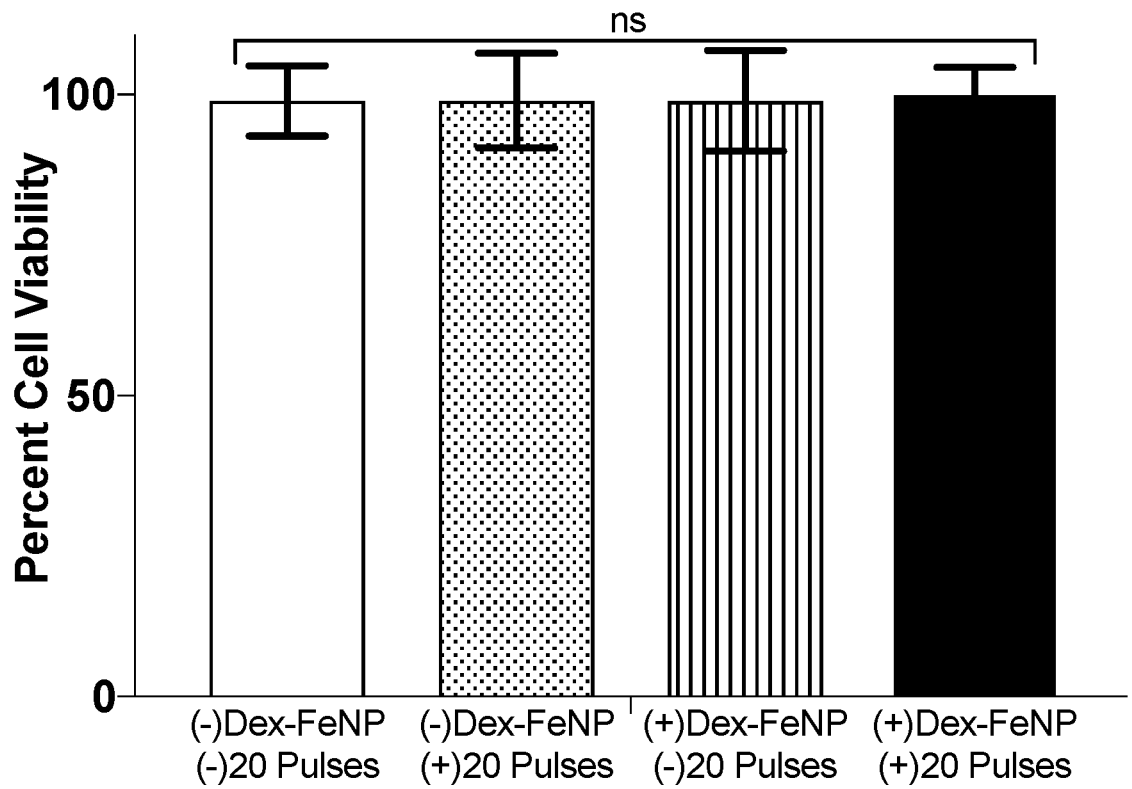
FIG. 10B shows that neither the MF pulses nor the FeNP have toxicity, even when present together in U-937 cells over a 72-h period. Error is standard deviation of the mean, n≥9 (triplicate of triplicates).

These results were confirmed by investigations into the possible individual and combination effects on long-term cell viability by the Dex-FeNPs and magnetic field pulses. As shown in FIG. 10A and FIG. 10B. There was no statistical difference in cellular viability. On the basis of these investigations, we can assume that neither the presence of Dex-FeNPs nor the application of magnetic field pulses, either separately or in combination, have any detrimental effects upon U-937 cell viability. Only the combination of these components of the process elicits the therapeutic effect in the presence of a drug, this corresponds to enhanced transport of small molecules.

Quantification of Doxorubicin Uptake by Combinatorial DEX-FeNP and Magnetic Field Quantification of doxorubicin uptake by U-937 cells was performed in the presence and absence of magnetic field pulses. While 50 magnetic field pulses were observed to lead to a marginally higher cellular death compared to 20 pulses, doxorubicin uptake was quantified under the latter conditions. Employing the same experimental conditions used for cellular death analysis, quantification of doxorubicin was achieved via HPLC. The protocol of this experiment differed from the cellular death analysis in that quantification of doxorubicin was performed 2 hours after administration, rather than 48 hours. Rationale for this is based upon the rapid translocation of doxorubicin into the nucleus where it elicits its therapeutic action.

Figure 11:
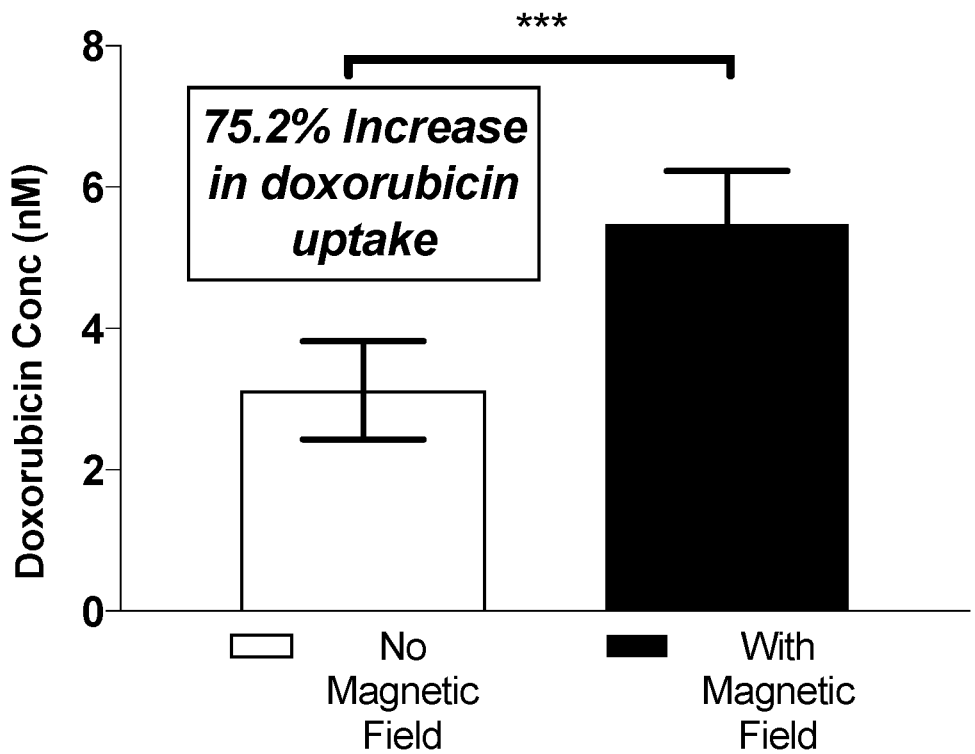
FIG. 11 is Quantification via HPLC of doxorubicin uptake within U-397 cells in the presence of Dex-FeNP over 2 hours. Samples subjected to 20 magnetic field pulses. Error is standard deviation of the mean, n≥9 (triplicate of triplicates).

HPLC measurement within U-937 cells in the absence and presence of magnetic field pulses showed a 75% increase of doxorubicin within cells treated under magnetic field pulses relative to those untreated (FIG. 11). Quantification of doxorubicin at later time points showed accumulation levels lower than 75% between the two systems. This decrease in free doxorubicin concentrations is likely the result of translocation into the nucleus as well as the initial point of DNA adduct formation. Notably, while there are reports that an increase in heat around the cell can translate into higher uptake of agents upon the cell exterior, there is no significant heat generation in this strategy.

The combination strategy of magnetic pulses with Dex-FeNP facilitates the increased rate of uptake of doxorubicin into the cells interior. If magnet pulses are not applied, there is no increase in doxorubicin uptake relative to cells with neither Dex-FeNP nor pulses.

Doxorubicin $IC_{50}$ in the Presence and Absence of Magnetic Field

Figure 12:
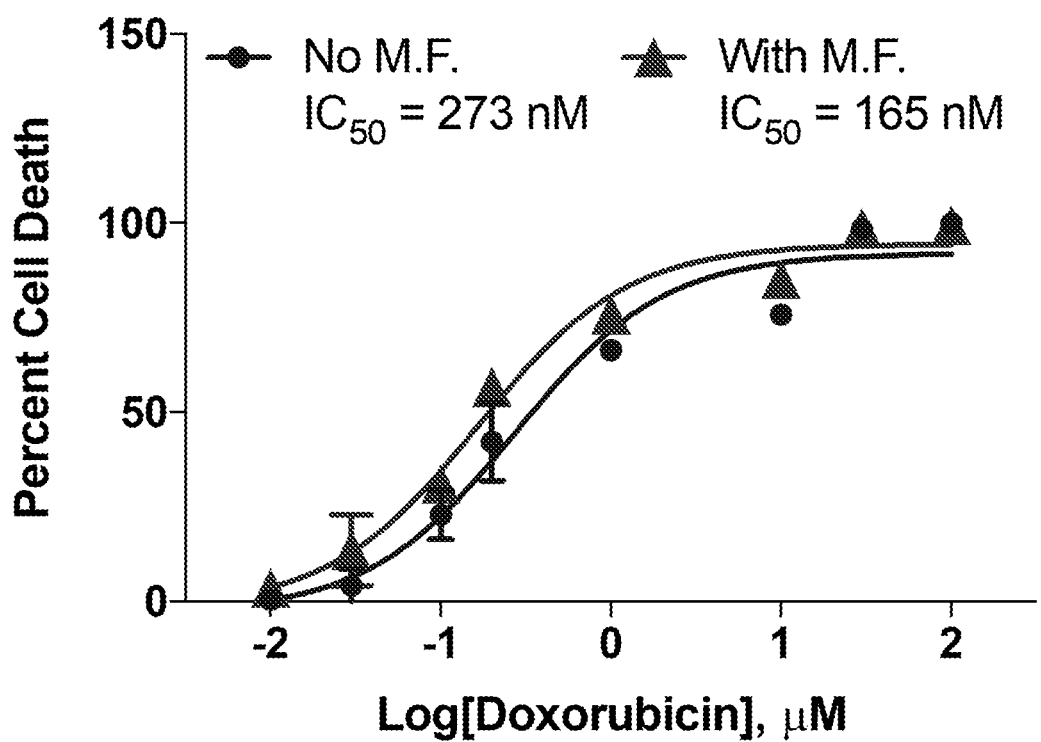
FIG. 12 shows the effects ($IC_{50}$) on U-397 cells in the presence of Dex-NeNP with and without magnetic field pulses. Samples subjected to 20 magnetic field pulses. Error is standard deviation of the mean, n≥9 (triplicate of triplicates).

Doxorubicin was observed to have an $IC_{50}$ of 273 nM in the presence of Dex-FeNP (0.0025 mg/mL) alone, but the $IC_{50}$ dropped in value, corresponding to an increase of cytotoxicity, to 165 nM when the combinational strategy was applied (FIG. 12). This shift in the $IC_{50}$ curve is similar to that of positive potentiators, and in this case it results in a 60% increase in cytotoxicity. Keeping in mind that the Dex-FeNP and the application of magnetic field pulses independently showed no change in cellular viability, this suggests that this combinational strategy is a non-toxic positive potentiating strategy for the increased uptake of desired agents, in this case anti-cancer agents.

The combinational strategy of magnetic pulse induced Dex-FeNP facilitated micropore formations does result in enhanced doxorubicin uptake and increase in efficacy of the anticancer drug. A 60% increase in cytotoxicity is observed with this combinational strategy.

Data Illustrating Broader Scope

Additional experiments were conducted with a different cancerous cell line, acute lymphocytic leukemia REH, with doxorubicin, as well as with a different cancer drug, 6-thiopurine, in both U-937 and REH cell lines.

Figure 13A:
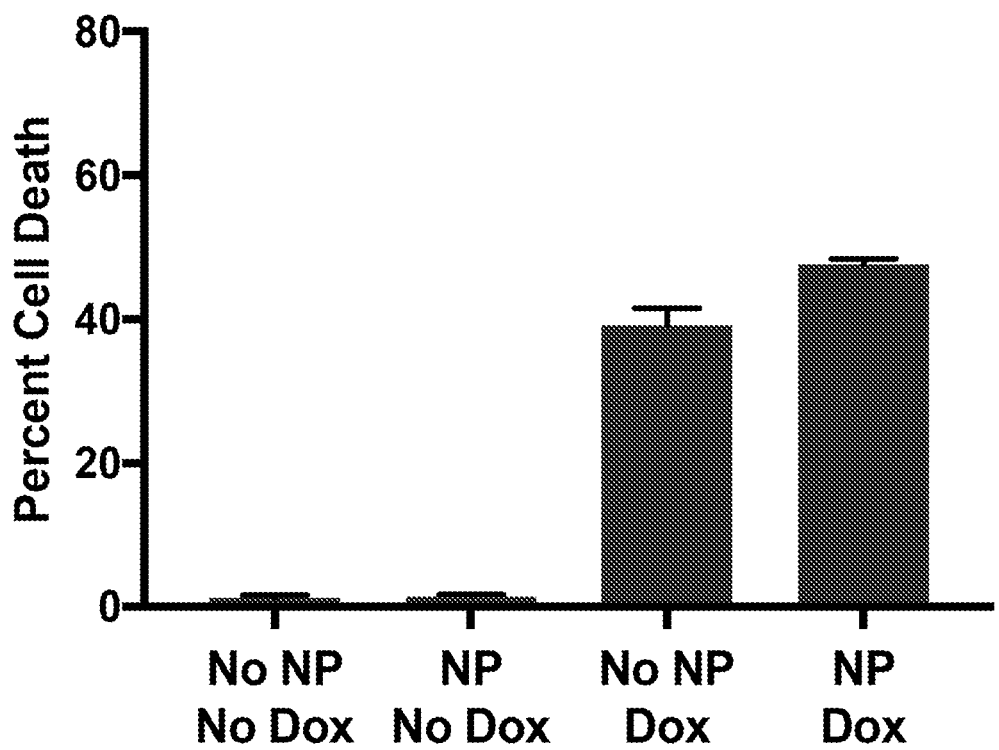
FIG. 13A shows the effects on REH cell death in the presence and absence of Dex-FeNP and doxorubicin with 20 MF pulses applied; Error is standard deviation of the mean, n≥3.
Figure 13B:
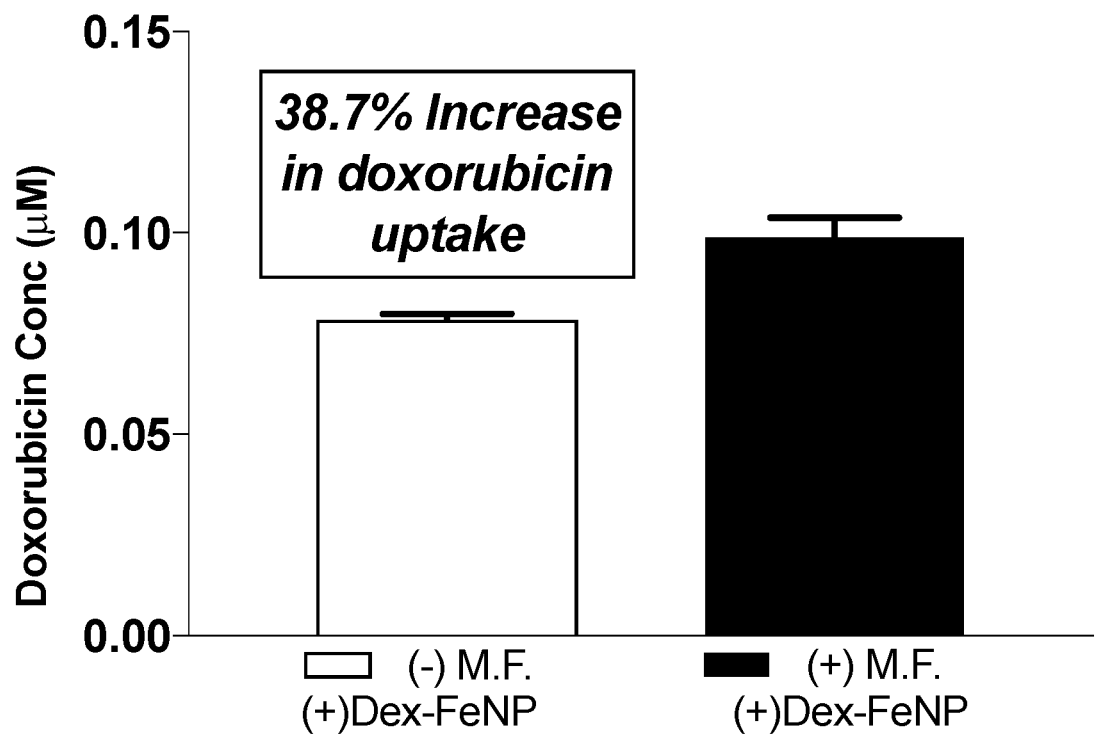
FIG. 13B shows and quantification of doxorubicin accumulation within the REH cell line over a 2 h period; Error is standard deviation of the mean, n≥9 (triplicate of triplicates).

Additional cancer cell line: Following the same protocol as outlined above, doxorubicin was evaluated in the REH cancerous cell line. As observed within the U-937 cell line, no increase in cell death was observed in the REH cell line in the absence of Dex-FeNP and doxorubicin (FIG. 13A) when 20 magnetic field pulses were applied. Similarly, no change in cell death was observed where Dex-FeNP were introduced. As previously observed, when doxorubicin was introduced in the absence of Dex-FeNP cell death increased to ~40%. A nearly 8% increase in cell death was observed when both Dex-FeNP and doxorubicin in the presence of the magnetic field was applied. A trend also observed within the U-937 cell line with doxorubicin. Accumulation of doxorubicin was investigated (FIG. 13B), which revealed a 38.7% increase in accumulation in the presence of 20 magnetic field pulses when REH cells were treated with Dex-FeN and doxorubicin. There was no increase in doxorubicin accumulation in the absence of Dex-FeN and magnetic field.

These results validate that the combinational strategy of magnetic pulse induced Dex-FeNP facilitated micropore formation leads to enhanced doxorubicin uptake and increase cell death in other cell lines.

Additional cancer drug: Doxorubicin is a low nM anti-cancer agent, extremely potent, with broad cytotoxic properties. 6-thiopurine (6TP) is a low μM anticancer agent, which is used in the treatment of acute lymphocytic leukemia. 6TP elicits its mode of action through incorporating into the DNA, a process that requires multiple cell cycles to complete. The drug mimics the natural purine adenine, which is activity pumped into the cell. 6TP also enters the cell through active transport (unlike doxorubicin).

Figure 14A:
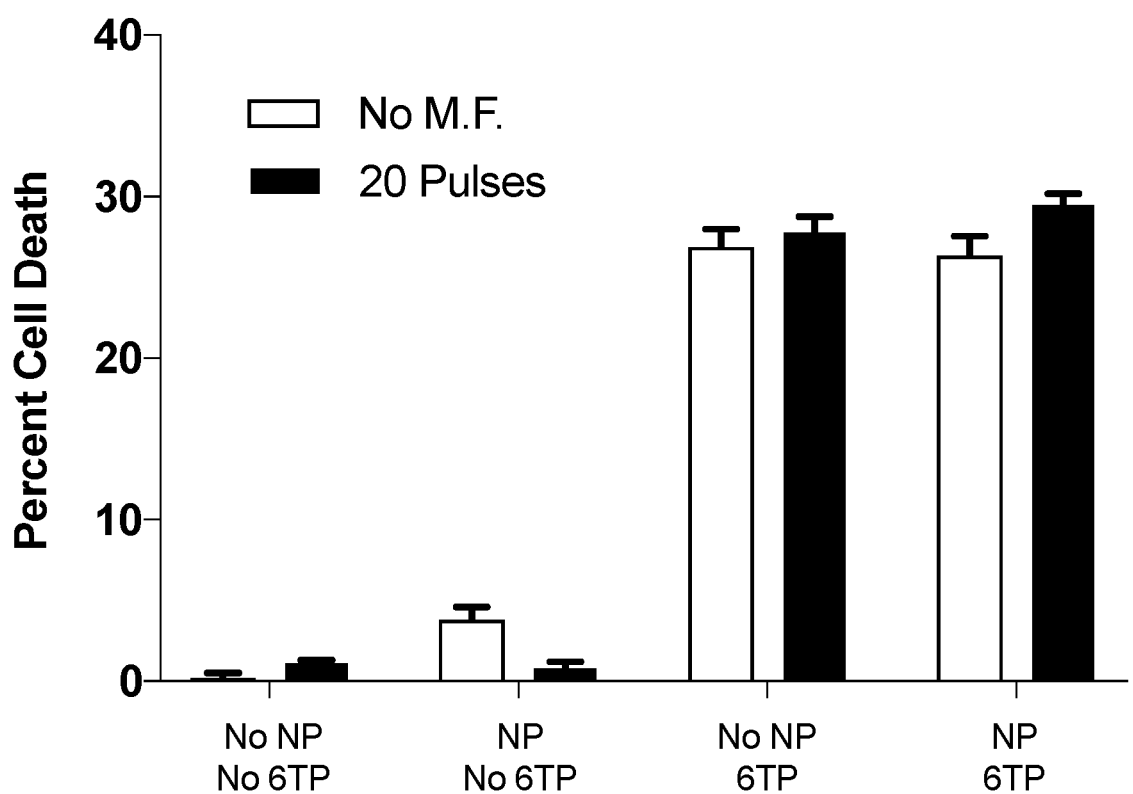
FIG. 14A shows the percentage of U-937 human cancer cell line cell death in combination treatments with either the presence or absence of Dex-FeNP, presence or absence of 6TP, and with either 0 or 20 MF pulses applied, over 48 h; Error is standard deviation of the mean, n≥9 (triplicate of triplicates).
Figure 14B:
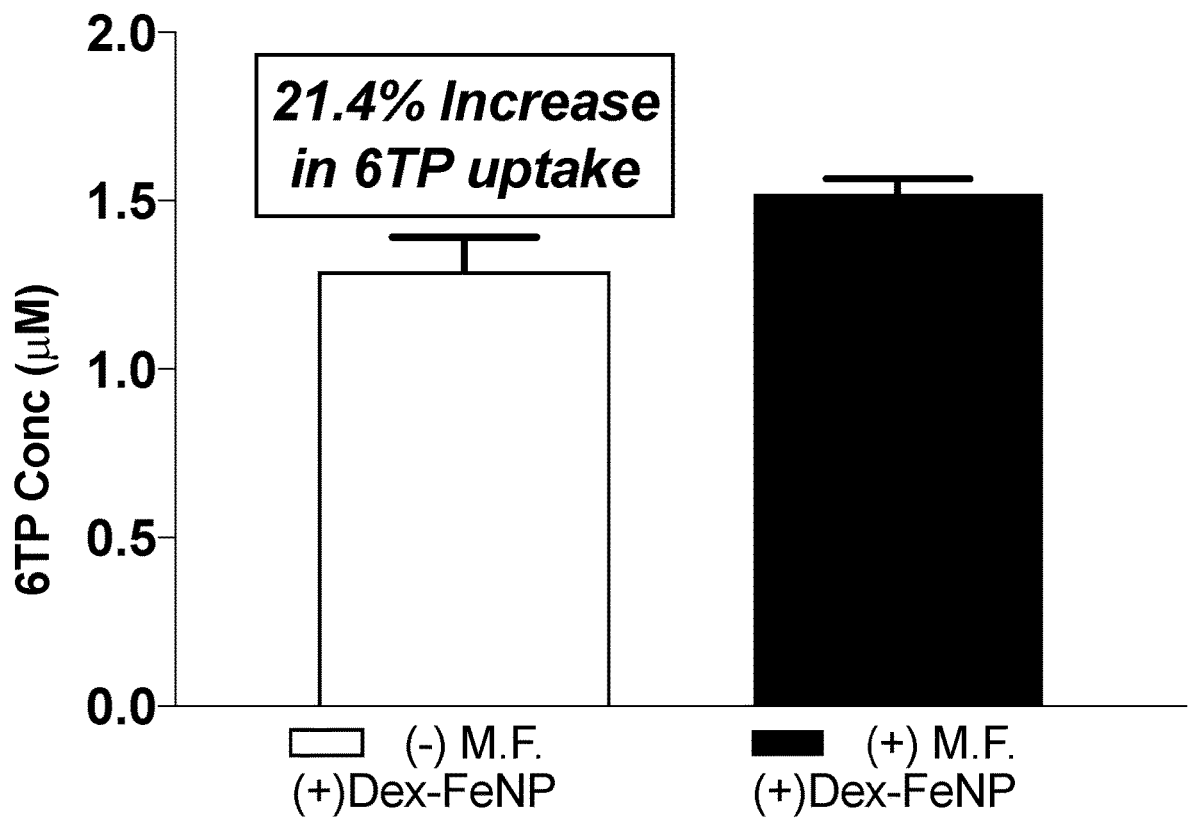
FIG. 14B shows the quantification of 6TP accumulation within U-937 cell line over a 2 h period. Error is standard deviation of the mean, n≥9 (triplicate of triplicates).
Figure 15A:
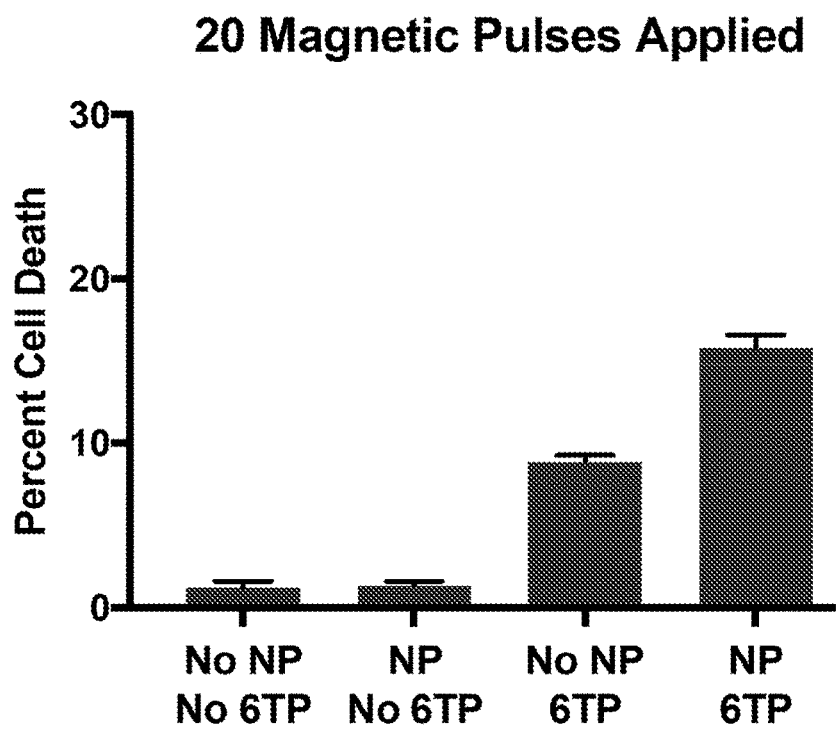
FIG. 15A shows the percentage of REH human cancer cell line cell death in combination treatments with either the presence or absence of Dex-FeNP, presence or absence of 6TP, and with either 0 or 20 MF pulses applied, over 48 h; Error is standard deviation of the mean, n≥9 (triplicate of triplicates).
Figure 15B:
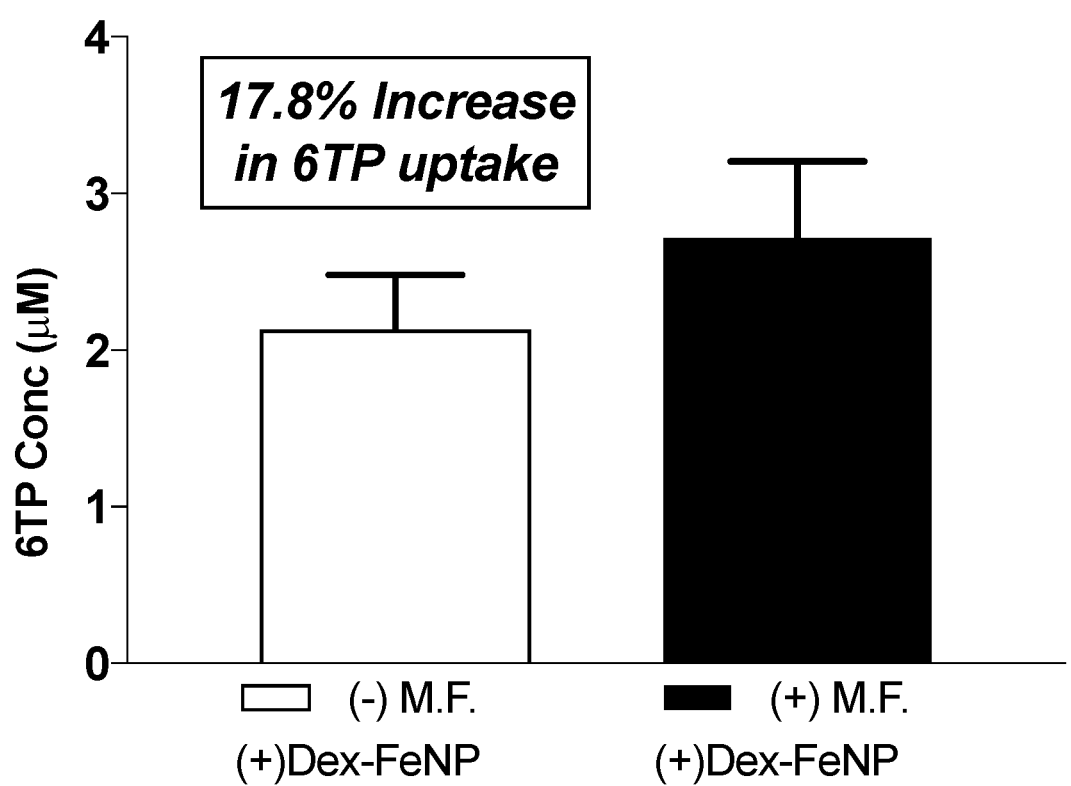
FIG. 15B shows the quantification of 6TP accumulation within REH cell line over a 2 h period. Error is standard deviation of the mean, n≥9 (triplicate of triplicates).

FIG. 14A illustrates that the combinational strategy of employing Dex-FeNP and 6TP, in the presence of magnetic field results in a 3% increase in cell death for the U-397 cells. While the percentage increase is not as superior as doxorubicin, this can be directly correlated to the mode of action of 6TP. Further, accumulation of 6TP was observed to increase by 21.4% when this combinational strategy is used (FIG. 14B). Most importantly to recall is that 6TP is already actively transported into the cell, and as such, this 21.4% increase is significantly large. The results for REH cells are shown in FIG. 15A and FIG. 15B.

Discussion

The application of in-homogenous magnetic fields in the presence of iron-oxide coated nanoparticles resulting in an increase efficacy of an anti-cancer agent is demonstrated. Through a systematic fashion, each of the three separate components of this combinational strategy was shown to be non-effective independently with regards to increased cellular uptake and increase in cytotoxicity of an anti-cancer agent. The synergistic strategy leads to a 60% increase in doxorubicin's cytotoxicity in cancer cells that were pre-incubated with Dextrin coated nanoparticles. This increase is thought to be caused by near 75% increase in cellular uptake and accumulation of doxorubicin via this combinational strategy. The quantity of doxorubicin that is present within the cells in this combinational strategy exceeds the amount required to cause its anticancer action. As such, we propose that lower concentrations of doxorubicin could even be employed via this strategy and result in the same therapeutic effect as with the currently prescribed dosages, which is associated with multiple toxic side effects, such as cardiac arrest, hepatotoxicity, and even death. We anticipate that through this strategy the side effects of this drug be reduced significantly, while retaining its full anticancer potential.

The combinational effects of this strategy have been shown in two different cancerous cell lines with two different drugs, further illustrating the potential universal applications of this strategy to targeted drug or active agent accumulation.

Materials and Methods

General Method for U-937 Growth

U-937 & REH cell lines were purchased from ATCC (American Tissue Culture Collection) and were grown in RPMI-1640 supplemented with fetal bovine serum (10% FBS) and 1% antibiotics (100 μg/mL penicillin and 100

U/mL streptomycin). Cells were incubated at 37° C. in a 5% $CO_2$, 95% humidity atmosphere, and were passage according to standard ATCC guidelines.

Determination of Optimal Dex-FeNP Concentration Via Doxorubicin Evaluation

To either 48 or 96 well plates was added doxorubicin (100 to 0.1 µM) in DMSO, Dex-FeNP (0.25 to 0 mg/mL), and U-937 or REH cells (4,000 cells/well and 40,000 cells/well, respectively) to final volumes of 50 and 700 µL. Samples were incubated for 48 h, cell viability was assessed by adding 5 and 70 µM of Alamar blue to each well, incubated for an additional 2 h, and fluorescence read. $IC_{50}$ values were determined from three or more independent experiments using Prism by GraphPad.

Visualization Methods for Nanoparticle Uptake in U-937

To a 48 well-plate was added a suspension of U-937 or REH in RPMI-1640 medium at a cell density of 40,000 cells/well to a final volume of 0.8 mL. To this was added Dex-FeNP (to achieve a final concentration 0.025 mg/mL), followed by incubation at 37° C. in a 5% $CO_2$ atmosphere for 24 h. The cells were transferred to an Eppendorf tube and centrifuged at 7,500 gravity for 8 min, after which the cell pellet was washed with 1.00 mL of PBS and removed three times to remove nanoparticles bound to the cellular surface. To the cell pellet was added 50 µL of ice-cold methanol and transferred to a 48 well plate and allowed to sit at −20° C. for 15 min, after which 0.5 mL of Prussian blue (20% potassium ferrocyanide solution and 20% HCl in a 1:1 ratio) was added and incubated at 37° C. for 20 min and then counter stained with the addition of 0.5 mL of nuclear fast red (1%) for 5 min. The cells were then washed with 1.0 mL of PBS three times, dried, and visualized under bright field transmission.

General Method for Cell Preparation, Handling, Transfer, Application of Magnetic Pulses A suspension of U-937 or REH in RPMI-1640 medium (cell density of 40,000 cells/well) was added to each well of a 48-well plate, final volume of 0.8 mL, to which 0.2 mL of a pre-prepared solution of Dex-FeNP was added to achieve a final concentration of 0.025 mg/mL and allowed to incubate. For experiments in which no Dex-FeNP was employed, 0.2 mL of media was added in place of the nanoparticle solution. After 24 h, 2 µL of a 0.1 mM doxorubicin solution in DMSO was added to each well to achieve a 0.2 µM concentration. For experiments in which doxorubicin was not used, 0.2 µL of DMSO was added. The contents of each well were then transferred to a sterilized 5-mm NMR-tube. Samples are then placed within a magnetic field generating system and subjected to magnetic pulses. Sample not exposed to the magnetic fields are left within the NMR-tubes for the same time duration as samples treated with the magnet field. Each sample in their respective NMR-tubes were inverted to ensure homogeneity after which 0.7 mL was transferred back to their respective wells on the 48-well plate. NOTE: Only 0.7 mL was transferred to ensure constant volume within each well post-magnetic field application.

General Method to Assess Cell Death in U-937 and REH

After following the general procedure above, samples were incubated for 48 h and then 70 µL of Alamar blue was added to each well and left to incubate for an additional 2 h. Cells were assessed for viability via standard methods for Alamar blue quantification.

General Method for Drug Uptake within U-937 and REH

After following the general procedures above, samples were incubated for 1.5 h. The cells were then transferred to an Eppendorf tube and centrifuged at 7,500 g for 5 mins, after which the suspension media was removed. The resulting cell pellet was washed with the addition of 0.7 mL of PBS and removed, twice. The cells were lysed with the addition of 0.35 mL of a lysis solution (EDTA, SDS, Tris HCl at pH 8.00), centrifuged at 20,000 gravity for 15 min to pellet large cellular debris, and the supernatant was removed and analyzed via HPLC for doxorubicin quantification.

HPLC Method for Doxorubicin Separation and Quantification

Analysis was performed using a Shimadzu HPLC system with C18 analytical column maintained at 32° C. Mobile phases consisted of water-formic acid (999:1, v/v, phase A) and acetonitrile-formic acid (999:1, v/v, phase B) filtered through a membrane filter (0.2 µm) prior to use. A gradient program starting at A:B (85:15, v/v) and ending at A:B (50:50, v/v) was applied over 20 min at a flow rate of 0.35 mL/min. (A:B-85:15-2 min, A:B 50:50-3-8 min, A:B 85:15-9-20 min). The column effluent was monitored via 590 nm.

Stock solution of doxorubicin was prepared in methanol and agitated for five minutes before use. Standard series of the doxorubicin 18, 9, 3, 1.8, 1.5, 0.9 and 0.5 µM were prepared by using the stock doxorubicin solution.

Discussion

The enhancement of drug cytotoxicity using the magnetic field-facilitated, magnetic nanoparticle microporation strategy is exemplified in U-937 cells (40,000 cells/mL) in 1.2 mL of media treated with a diluted magnetic nanoparticle stock solution for 24 h, after which doxorubicin was added and the cells were immediately transferred to a sterilized NMR tube for magnetic field application. The magnet used with the NMR "Sample tube" was position within the coils of the magnet. Samples were either treated with no magnetic field or exposed to 20 or 50 magnetic pulses. To investigate the combination and individual role each component (magnetic nanoparticles, magnetic field, & doxorubicin) would play, all variation was screened under the magnetic field protocol outlined. When no magnetic field, magnetic nanoparticles, or drug was used there was nearly no cell death (small percentage of death accounted to cell transfer between vessels and removal from ideal incubation conditions) shown in FIG. 7. There was little increase in cell death, within statistical deviation limits, when the magnetic nanoparticles were introduced under the magnetic field variations. Thereby illustrating that the magnetic nanoparticles alone does not enhance, nor possess any cytotoxicity. Noting the effectiveness of doxorubicin (dox) as an anticancer agent, investigations into the behavior of dox without magnetic nanoparticles were undertaken. As expected, the inclusion of dox resulted in a nearly 50% increase in cytotoxicity under each of the magnetic field variations. This would serve as our bench control for effectiveness. Lastly, when the cultures were pre-treated with magnetic nanoparticles, exposed to dox, but not magnetic field a ~50% cell death was observed. Similar to the system in which no magnetic nanoparticles were employed, thereby further supporting that the presence of the magnetic nanoparticles have no significant effects upon cellular toxicity alone. Excitingly, when 20 pulses of the magnetic field were applied nearly an 8% increase in cell death was observed. Proving our working hypothesis to be true. When 50 pulses were applied a 12% increase in cell death was observed.

Given the results obtained, we can conclude that it is the combination of magnetic nanoparticles and the magnetic field that is responsible for the increase in cell death. To quantify the amount of dox present within the cells in the absence and presence of the magnetic field, an HPLC method has been developed that has allowed base-line separation of doxorubicin, possesses a five-minute window for cellular debris, and had excellent linearity and limits of detections. Employing the same procedure, cells were incubated with the magnetic nanoparticles, treated with dox in the absence and presence of the magnetic field and left to incubate. After 1.5 h, the cells were pelleted, washed twice with sterile PBS, lysed, centrifuged to removal large cellular debris, and then analyzed via HPLC. There was a 75.2% increase in doxorubicin concentration within the cells treated with the magnetic field compared those cells not treated. Given the significant increase in concentration of the desired "agent" by this method, the applications for delivery of single or possibly combinational agents can easily be envisioned.

The invention claimed is:

1. A method of enhancing intracellular uptake of active agents into the interior of a cell by inducing temporary pore formation in a cell membrane, said method comprising:
    targeting a cell in vivo, ex vivo, or in cell culture with magnetic nanoparticles, wherein said magnetic nanoparticles are taken up by said cell into the interior of the cell to yield internalized magnetic nanoparticles;
    separately presenting one or more active agents to said cell, before, after, or simultaneously with said magnetic nanoparticles; and
    applying an inhomogeneous magnetic field to said cell for targeted excitation of said internalized magnetic nanoparticles to induce said temporary pore formation in said cell membrane to yield pores in said cell membrane and an altered cell having temporarily increased permeability, wherein after said applying step said one or more active agents are taken up in an increased amount and/or at an increased rate by said altered cell having temporarily increased permeability as compared to an untreated cell.

2. The method of claim 1, further comprising removing said magnetic field from said altered cell having temporarily increased permeability, wherein said pores in said cell membrane close after removing said magnetic field, resulting in an increased concentration of the active agent within said altered cell having temporarily increased permeability as compared to an untreated cell.

3. The method of claim 1, wherein said cell is a cancer cell, said magnetic nanoparticles comprising one or more targeting moieties for preferential or more rapid uptake by said cancer cell as compared to non-cancerous cell.

4. The method of claim 1, wherein said magnetic nanoparticles are superparamagnetic nanoparticles having an average diameter of less than 100 nm.

5. The method of claim 1, wherein said magnetic nanoparticles are coated.

6. The method of claim 1, wherein said applying said magnetic field comprises applying at least 20 magnetic field pulses to said cell.

7. The method of claim 6, wherein said applying said magnetic field pulses induces rapid changes in magnitude of the magnetic field applied to said cell.

8. The method of claim 1, wherein said targeted excitation of said magnetic nanoparticles locally induces sonoporation from within said cell via ultrasound waves generated by said excited nanoparticles.

9. The method of claim 1, wherein said magnetic field reaches a maximum value of 800 Tesla/m.

10. The method of claim 1, wherein said one or more active agents are selected from the group consisting of bioactive molecules, therapeutics, prophylactics, antibiotics, cytotoxic compounds, diagnostic agents, chemotherapeutics, and pharmaceutically acceptable salts thereof.

11. The method of claim 1, wherein targeting said cell with said magnetic nanoparticles comprises administering said nanoparticles to a subject, wherein said magnetic nanoparticles localize near and are taken up by said cell.

12. The method of claim 11, wherein said magnetic nanoparticles are locally injected into said subject at or near a site of said cell or are systemically administered to said subject.

13. The method of claim 1, wherein said separately presenting one or more active agents to said cell comprises administering said one or more active agents to a subject, wherein said one or more active agents localize near said cell, said one or more active agents being co-administered with said nanoparticles but separately therefrom or being administered after said magnetic nanoparticles.

14. The method of claim 13, wherein said one or more active agents are locally injected into said subject at or near a site of said cell or are systemically administered to said subject.

15. The method of claim 1, wherein said magnetic nanoparticles and/or said one or more active agents are co-cultured with said cell in vitro.

16. The method of claim 1, wherein said cell is a microbial cell, wherein said one or more active agents is an antimicrobial having a cytotoxic effect on said microbial cell.

17. The method of claim 1, wherein said one or more active agents are selected from the group consisting of small molecule drugs, macromolecules, biologics, nucleotides, nutritional supplements, nutraceuticals, and pharmaceutically acceptable salts thereof.

* * * * *